(12) United States Patent
Joseph et al.

(10) Patent No.: US 11,831,408 B2
(45) Date of Patent: Nov. 28, 2023

(54) COMPUTER-IMPLEMENTED METHODS AND SYSTEMS FOR CONTROLLING TASKS IMPLEMENTED BY A CYCLICALLY-ORDERED SET OF NODES PARTICIPATING IN A BLOCKCHAIN NETWORK

(71) Applicant: nChain Licensing AG, Zug (CH)

(72) Inventors: Daniel Joseph, London (GB); Silvia Bartolucci, London (GB); Pauline Bernat, London (GB)

(73) Assignee: nChain Licensing AG, Zug (CH)

( * ) Notice: Subject to any disclaimer, the term of this patent is extended or adjusted under 35 U.S.C. 154(b) by 306 days.

(21) Appl. No.: 17/048,983

(22) PCT Filed: Apr. 10, 2019

(86) PCT No.: PCT/IB2019/052946
§ 371 (c)(1),
(2) Date: Oct. 19, 2020

(87) PCT Pub. No.: WO2019/202437
PCT Pub. Date: Oct. 24, 2019

(65) Prior Publication Data
US 2021/0243022 A1 Aug. 5, 2021

(30) Foreign Application Priority Data
Apr. 20, 2018 (GB) ...................... 1806448

(51) Int. Cl.
*H04L 9/30* (2006.01)
*H04L 9/06* (2006.01)
*H04L 9/00* (2022.01)

(52) U.S. Cl.
CPC .............. *H04L 9/30* (2013.01); *H04L 9/0643* (2013.01); *H04L 9/50* (2022.05)

(58) Field of Classification Search
CPC . H04L 9/30; H04L 9/0643; H04L 9/50; H04L 9/0825; H04L 9/3066; G06Q 20/29; G06Q 20/223; G06Q 20/382; G06Q 20/40
See application file for complete search history.

(56) References Cited

U.S. PATENT DOCUMENTS

| 2017/0324711 | A1 | 11/2017 | Feeney et al. |
| 2018/0018723 | A1 | 1/2018 | Nagla et al. |

(Continued)

FOREIGN PATENT DOCUMENTS

| EP | 3257191 A1 | 12/2017 |
| WO | 2017145008 A1 | 8/2017 |

(Continued)

OTHER PUBLICATIONS

Antonopoulos, "Mastering Bitcoin—Unlocking Digital Cryptocurrencies," O'Reilly Media, Inc., Dec. 20, 2014, 282 pages.

(Continued)

*Primary Examiner* — Mohammed Waliullah
(74) *Attorney, Agent, or Firm* — Davis Wright Tremaine LLP

(57) ABSTRACT

A method of controlling and coordinating of processing steps in a distributed system is disclosed. The method may be implemented by a node in a cyclically-ordered set of nodes participating in a blockchain network. The method includes receiving, from an immediately subsequent node, values corresponding to combinations of possible outcomes of processing steps associated with nodes from that node through to a node immediately preceding a supervisor node. The values are based on public keys associated with the nodes corresponding to possible outputs and the supervisor's public key. State values are generated based on the values and public keys corresponding to the possible outcomes further to a processing step of the node and are shared with (Continued)

the supervisor and an immediately previous node. A blockchain transaction is prepared to transmit control of a resource from the node to the immediately subsequent node upon supply of one of a set of unlocking values corresponding to the received values.

20 Claims, 14 Drawing Sheets

(56) References Cited

U.S. PATENT DOCUMENTS

| | | | |
|---|---|---|---|
| 2018/0109541 | A1 | 4/2018 | Gleichauf |
| 2019/0013933 | A1* | 1/2019 | Mercuri ................. G06F 16/904 |
| 2019/0251295 | A1* | 8/2019 | Vieyra ...................... H04L 9/30 |

FOREIGN PATENT DOCUMENTS

| | | |
|---|---|---|
| WO | 2017145048 A1 | 8/2017 |
| WO | 2018007828 A2 | 1/2018 |
| WO | 2018193341 A1 | 10/2018 |
| WO | 2018234991 A1 | 12/2018 |

OTHER PUBLICATIONS

Bashir, "Mastering Bitcoin: Distributed Ledgers, Decentralization and Smart Contracts Explained," Packt Publishing, ISBN 978-1-78712-544-5, Mar. 2017, 532 pages.
Bentov et al., "How to Use Bitcoin to Design Fair Protocols," Annual Cryptology Conference, 2014, 38 pages.
Burchert et al., "Scalable Funding of Bitcoin Micropayment Channel Networks," Royal Society Open Science, Aug. 29, 2018, 18 pages.
Franco, "Understanding Bitcoin: Cryptography, Engineering, and Economics," Wiley ISBN: 9781119019169, 238 pages.
Green et al., "Bolt: Anonymous Payment Channels for Decentralized Currencies," CCS'17, Oct. 30-Nov. 3, 2017, 17 pages.
International Search Report and Written Opinion dated May 31, 2019, Patent Application No. PCT/IB2019/052946, 12 pages.
Kumaresan et al., "How to Use Bitcoin to Incentivize Correct Computations," retrieved from https://people.csail.mit.edu/ranjit/papers/incentives.pdf, Nov. 2014, 12 pages.
Lombrozo, "Dynamic Hierarchical Deterministic Key Trees," https://github.com/bitcoin/bips/blob/master/bip-0083.mediawiki, Nov. 16, 2015, 3 pages.
Malavolta et al., "Anonymous Multi-Hop Locks for Blockchain Scalability and Interoperability," NDSS Symposium, 2018, 30 pages.
Malavolta et al., "Concurrency and Privacy with Payment-Channel Networks," 2017 ACM SIGSAC Conference, Oct. 2017, 27 pages.
Malavolta et al., "Privacy-preserving Multi-hop Locks for Blockchain Scalability and Interoperability," Oct. 23, 2018, 29 pages.
Mukhamedov et al., "Analysis of a Multi-Party Fair Exchange Protocol and Formal Proof of Correctness in the Strand Space Model," International Conference on Financial Cryptography and Data Security, Feb. 28, 2005, 15 pages.
Nakamoto, "Bitcoin: A Peer-to-Peer Electronic Cash System," Bitcoin, Oct. 31, 2008, https://bitcoin.org/bitcoin.pdf, 9 pages.
OConnor et al., "Enhancing Bitcoin Transactions with Covenants," Lecture Notes in Computer Science, Nov. 19, 2017.
Raval, "Decentralized Applications," O'Reilly, ISBN: 978-1-491-92454-9, Jul. 13, 2016, 118 pages.
Satoshi et al., "Connection Limits," Bitcoin Forum, Aug. 9, 2010, https://bitcointalk.org/index.php?topic=741.0;prev_next=prev, 2 pages.
JK Commercial Search Report dated Nov. 9, 2018, Patent Application No. GB1806448.5, 7 pages.
UK IPO Search Report dated Oct. 17, 2018, Patent Application No. GB1806448.5, 7 pages.
Wilkinson, "Introduction to Micropayment Channels," http://super3.org/author/shawn/, Apr. 13, 2016, 4 pages.

* cited by examiner

COMPUTER-IMPLEMENTED METHODS AND SYSTEMS FOR CONTROLLING TASKS IMPLEMENTED BY A CYCLICALLY-ORDERED SET OF NODES PARTICIPATING IN A BLOCKCHAIN NETWORK

The present application relates generally to decentralized computing systems. More particularly it relates to control and coordination of processing steps associated with nodes of a distributed computing system, including directing and controlling ordered processing steps using a blockchain network. The invention also relates to allocation of resources within distributed computing systems and networks, and the use of cryptographic techniques and mechanisms for implementing and enforcing control and allocation of such resources, and for hierarchical organisation and arrangement of entities/nodes within the system.

The advantages of distributed systems are numerous, including resilience to potential attacks, sharing of resources and effort etc. In distributed computing systems, various computing devices acting as nodes in the distributed system may communicate via a network Messages may be exchanged between these nodes. Such an exchange of messages may, for example, allow the nodes to cooperate to perform computing tasks. Such tasks may involve processing distributed across various of the nodes. Such distributed processing may require control and coordination of steps associated with various of the nodes. For example, a particular processing order may be enforced.

One example of a distributed system may arise in the context of a driverless car. For example, a driverless car may include various modules, each with its own sensor data. Each of these modules may be responsible for performing particular processing steps. Additionally, it may be that a driverless car consults with one or more internal and one or more external nodes to perform certain processing, such as for example, may relate to the control of the vehicle. External nodes may, for example, be web or cloud-based.

In such distributed systems, it may be necessary or desirable to be able to enforce ordering of steps in a processing task. For example, the nodes may need to perform processing steps in order. The processing steps may then combine to result in one of a plurality of possible results for the task. Other technical challenges often encountered in respect of distributed systems include difficulties arising from the allocation of resources within the network or system, and how to organise actors (i.e. nodes) and communication between them in an efficient and robust manner Organisation of nodes and hierarchical considerations also present challenges within distributed systems. It would be advantageous to have hierarchical arrangements and control flows within distributed systems being enforced and determined via mathematical and cryptographic techniques. This would provide benefits relating to security and automation of processes.

Attempts at providing online voting or decision making protocols are generally constructed in such a way to attempt to prevent abuse but in manners reliant on a central authority to validate and take into account votes or feedback. The central authority may use different cryptographic primitives, such as blind signatures and homomorphic encryption, to add secrecy and eligibility's verification to the ballot vote—see, e.g., "Distributed Protocols at the Rescue for Trustworthy Online Voting" by R. Riemann and S. Grumbach available via arXiv preprint arXiv:1705.04480. For example, a centralized voting protocol is described in "Untraceable electronic mail, return addresses, and digital pseudonyms" by D. L. Chaum (1981), Communications of the ACM, 24(2), 84-90. In Chaum's protocol participants send their votes to centralized mixing authorities that, using the Mix Nets set-up, reshuffle and encrypt the vote before their broadcast, in order to disguise vote-voters link.

Other earlier works remove the dependency on central trusted authorities but rely on cooperation amongst participants. For example, "Protocols for secure computations" by A. C. Yao (November 1982), in *Foundations of Computer Science,* 1982. SFCS'08. 23*rd Annual Symposium on* (pp. 160-164), describes Secure Multi-Party Computations (MPCs) protocols, whose goal is to enable a set of users to compute a function of their joint private inputs, which they want to keep secret, without the need of a trusted third party. MPCs might allow parties to jointly compute their average vote privately and securely but, correspondingly, rely on cooperation amongst the parties.

More fundamentally, each of the aforementioned earlier works are intended for independent choices and not non-independent choices, let alone for performing processing steps in a prescribed order to arrive at a result.

In light of the above, one technical problem may be how to provide a solution which allows for and enforces ordering of processing steps by nodes in distributed systems. Another technical problem may be how to provide a tamperproof or tamper-resistant record of the results resulting from such ordered processing in a distributed system. Another technical problem may be how to use cryptographic techniques for enforcing control and/or hierarchies and permissions (e.g. access permissions) within distributed systems.

Providing solutions to one or more of the aforementioned technical problems may involve the use of a blockchain. In this document the term 'blockchain' is used to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration only, it should be noted that the subject matter of the present application is not limited to use with the Bitcoin blockchain and alternative blockchain implementations and protocols fall within the scope of the present application.

A blockchain is a peer-to-peer, electronic ledger which is implemented as a computer-based decentralised system made up of blocks which in turn are made up of transactions. Each transaction is a data structure that encodes the transfer of control of a digital asset between addresses in the blockchain system and includes at least one input and at least one output. Each block contains a hash of the previous block to that blocks become chained together to create a permanent, unalterable record of all transactions which have been written to the blockchain since its inception.

Blockchains can be employed in a wide variety of applications. For example, a blockchain may be employed in providing a ledger reflecting ownership of one or more commodities. For example, in the Bitcoin blockchain the ledger reflects ownership of Bitcoins and fractions thereof. Some such commodities may represent an underlying unit such as for example, units of computing resources.

In accordance with the present application there are provided method(s) and system(s) as defined in the appended claims.

The invention may provide a computer implemented method for distributed control. The method may include receiving, by a particular node in a cyclically-ordered set of nodes participating in a blockchain network from a node immediately subsequent to the particular node, values corresponding to combinations of possible outcomes of processing steps associated with nodes from the immediately subsequent node through to a node immediately preceding a supervisor node. The values may be based on public keys associated with the nodes, each corresponding to possible outcomes of a processing step associated with that node, and on a public key of the supervisor node. The method may include generating, by the particular node, state values based on the received values and on public keys corresponding to possible outcomes of a processing step associated with the particular node. The method may include sharing, by the particular node, the state values with the supervisor node and with a node immediately previous the particular node. The method may include preparing, by the particular node using the state values, a blockchain transaction arranged to transmit control of a resource from a source address associated with the particular node to a receiving address of the immediately subsequent node responsive to satisfaction of an execution condition including supply of any one of a plurality of unlocking values corresponding to the received values.

In some implementations, nodes may correspond to modules associated with a system and the possible outcomes of a processing step associated with a given node may correspond to outputs of an associated module of a control system of the system.

In some implementations, each of the received values may be determined by combining a public key associated with the supervisor node with ones of the public keys corresponding to a respective one of the combinations of possible outcomes of processing steps associated with nodes from the immediately subsequent node through to the node immediately preceding the supervisor node.

In some implementations, a given one of the received values may be determined by summing the public key associated with the supervisor node and the ones of the public keys corresponding to the outcomes of the respective one of the combinations of possible outcomes.

In some implementations, the state values may be formed by combining the received values and the public keys corresponding to possible outcomes of a processing step associated with the particular node.

In some implementations, the state values may be formed by summing one of the received values and one of the public keys corresponding to possible outcomes of processing step associated with the particular nodes.

In some implementations, another blockchain transaction may be arranged to return control of the second resource to the particular node upon satisfaction of a return condition. In some implementations, the method may further include waiting for the blockchain transaction to execute and obtaining, from the transaction, a first unlocking value used to unlock the transaction, the first unlocking value indicating outputs of processing steps associated with nodes from the immediately subsequent node through to the node immediately preceding the supervisor node and based on private keys corresponding to ones of the public keys associated with those nodes and corresponding to the outputs.

Such a method may include identifying one of possible outcomes of the processing step associated with the particular node. Such a method may include determining, by the particular node, a second unlocking value based on a private key that corresponds to the public key corresponding to the identified outcome and the unlocking value. The second unlocking value may correspond to one of the state values and may indicate outputs of processing steps associated with nodes from the particular node through to the node immediately preceding the supervisor node. Such a method may include using the second unlocking value, executing another blockchain transaction.

In some implementations, the another blockchain transaction may be prepared by the immediately previous node and may be arranged to transmit control of a second resource from a source address associated with the immediately previous node to a receiving address of the particular node responsive to satisfaction of an execution condition including supply of any one of a second plurality of unlocking values corresponding to one of the state values. The blockchain transaction arranged to transmit control of the resource from the source address associated with the particular node to the receiving address of the immediately subsequent node may be prepared after preparation of the another blockchain transaction.

In some implementations, each of the unlocking values of the second plurality of unlocking values may correspond to a respective one of the state values and may be based on private keys corresponding to the public keys upon which that state value is based.

In some implementations, the unlocking value may be a sum of the private keys corresponding to the outputs of processing steps associated with nodes from the immediately subsequent node through to the node immediately preceding the supervisor node and a private key corresponding to the public key associated with the supervisor node.

In some implementations, the second unlocking value may be a sum of the private keys corresponding to the outputs of processing steps associated with nodes from the particular node through to the node immediately preceding the supervisor node and a private key corresponding to the public key associated with the supervisor node.

In some implementations, the resource and the second resource may be identical.

In some implementations, each public key and its corresponding private key may form an elliptical curve cryptography public-private key pair.

The present invention may also provide a computer implemented system for carrying out a method in accordance with the foregoing.

The present invention may also provide a non-transitory computer-readable storage medium storing instructions for adapting a computer system to perform a method in accordance with the foregoing.

Any feature described in relation to one aspect or embodiment of the invention may also be used in respect of one or more other aspects/embodiments. These and other aspects of the present invention will be apparent from and elucidated with reference to, the embodiment described herein. An embodiment of the present invention will now be described, by way of example only, and with reference to the accompanying drawings, in which.

Like reference numerals are used in the drawings to denote like elements and features.

Figure 1:
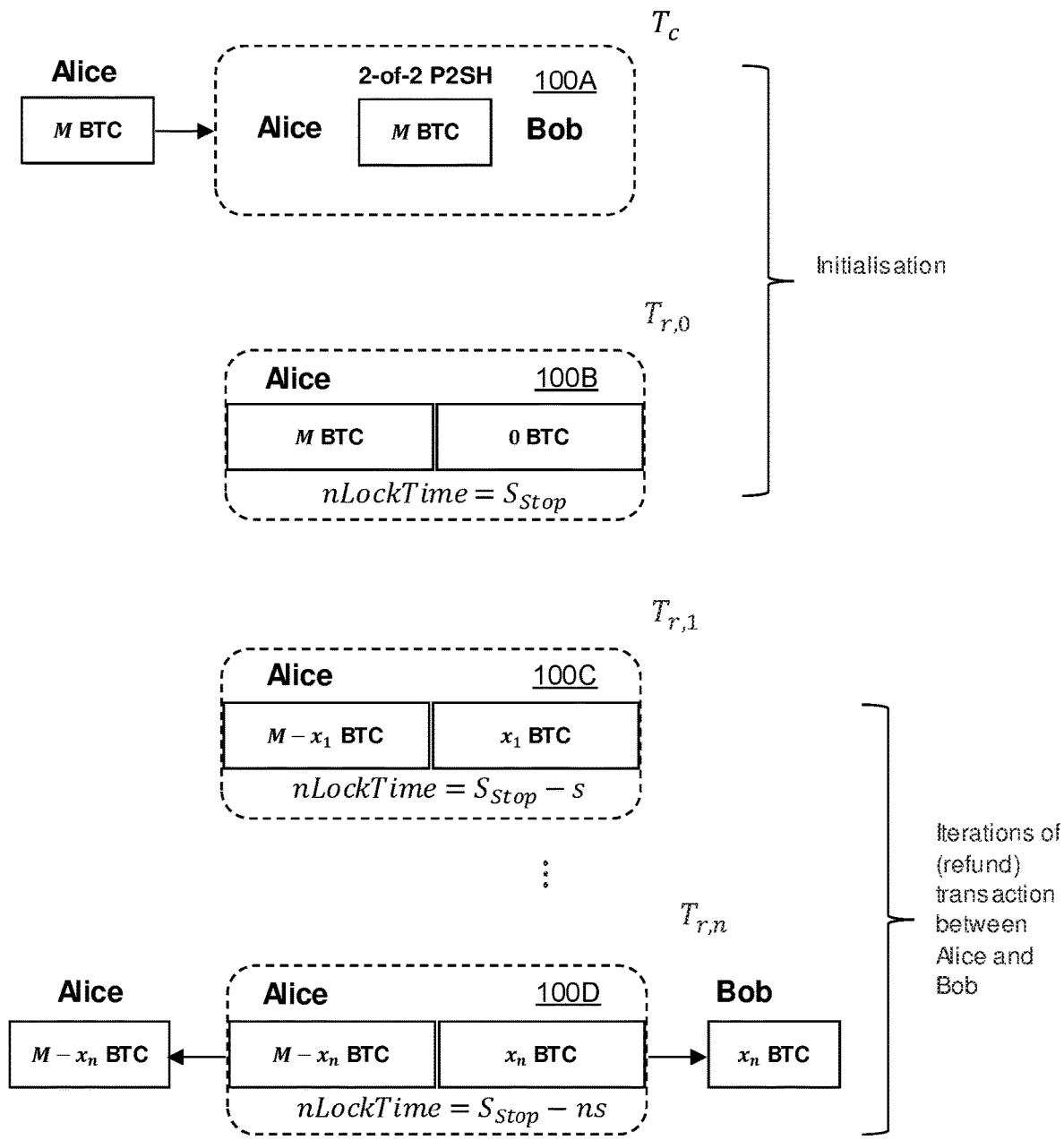
FIG. 1 shows the transactions used in a payment channel.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A protocol embodying the present invention is described herein for a group of cooperating nodes to each make decisions in an ordered fashion. It is built on the concept by requiring nodes to commit units of computing resources that they may only recover by the utilization of an accumulated secret value that was derived from outputs of previous steps in a processing task.

The protocol described herein builds on an existing Bitcoin-related technology, Payment Channels (see, e.g., 'Introduction to Micropayment Channels' http://super3.org/introduction-to-micropayment-channels/,), which is a technique designed for off-block Bitcoin transactions between a pair of participants and notably incorporates the usage of refund transactions.

Payment Channels

As mentioned above, payment channels are referred to in the following description and soan overview of payment channels follows for the convenience of the reader.

Payment channels are techniques designed for parties to make multiple cryptocurrency transactions without committing all of the transactions to the blockchain. In a typical payment channel implementation, a nearly unlimited amount of payments can be made but it is only ever necessary to add two transactions to the blockchain.

In addition to the reduced number of transactions being added to the blockchain and the associated reduced costs, payment channels also offer the advantage of speed and, importantly, the ability of the parties to have units refunded if the things do not go as planned or either participant decides not to proceed beyond a certain set of payments. A description of a payment channel implementation is outlined below.

Consider the scenario where Alice needs to transfer blockchain resources to Bob. This may require multiple payments from Alice to Bob over a period of time as the situation demands Alice expects to transfer at most, for example, 15 BTC (in total) to Bob in the possible set of exchanges. To facilitate this, a payment channel is established between Alice and Bob and operates as follows.

First, Alice creates a 2-of-2 multi-signature pay-to-script hash (P2SH) transaction, $T_c$, governed by both Alice and Bob that commits 15BTC originating from Alice. At this point the transaction is not submitted to the Bitcoin network (such a multi-signature address requires that 2 individuals (Alice and Bob) cryptographically sign any transaction that spends money from this address);

Next, Alice creates a separate refund transaction, $T_{r,0}$, returning all units of the multi-signature controlled funds to Alice. This transaction includes an nLockTime value of 100 blocks (nLockTime is a Bitcoin transaction parameter that allows a Bitcoin transaction to only be executable after a specified time has passed). Bob signs the transaction. This refund transaction allows Alice to be refunded, after nLockTime has transpired, if the exchange between Alice and Bob goes awry;

Next, Alice signs the original transaction $T_c$.

At this point Alice and Bob may proceed to create new refund transactions to reflect the (off the blockchain) transfers being made from Alice to Bob. These refund transactions would reflect the net quantity of resources that Alice is required to transfer to Bob at that point in time. As an example, if Alice is to transfer Bob 5BTC, a new refund transaction, $T_{r,i}$, is created that has an output sending 5BTC to Bob and 10BTC back to Alice. If Alice needs to transfer another 5BTC to Bob then the new refund transaction, $T_{r,i+1}$, is created with outputs sending 10BTC to Bob and 5BTC to Alice. For each new refund transaction, assuming they are in agreement with the details, both parties sign the transaction but do not necessarily submit the transaction to the network.

Note that each successive refund transaction created has a lower nLockTime than that of the previous refund transaction—i.e., $nLockTime(T_{r,i+1}) < nLockTime(T_{r,i})$.

If a participant refuses to sign any $T_{r,i}$ then an aggrieved participant may simply submit the $T_{r,i-1}$. In the worst-case scenario Alice signs $T_{r,0}$ and submits it to the network reclaiming all her units (after nLockTime has expired).

The final refund transaction constructed represents the net sum of the units being transferred from Alice to Bob. This transaction is submitted to the network.

FIG. 1 shows the transactions $T_c$ 100A, and $T_{r,n}$ 100D used in a payment channel. M represents the maximum amount of money that may be sent from Alice to Bob. $x_i$ is the current net sum of the units Alice needs to pay to Bob. Swop is the nLockTime on the initial refund transaction. n is the number of refund transactions created in the ongoing (off-block) transfers made between Alice and Bob (this excludes the initial refund transaction). s is the time allotted for both participants (Alice and Bob) to agree to a refund transaction before a party risks the other party submitting the previous refund transaction, effectively ending the exchanges between Alice and Bob.

Note that: $t+n*s < S_{stop}$, where t is the current time, and $(S_{stop} - n*s) \geq s$.

Transactions $T_c$ 100A, $T_{r,0}$ 100B, $T_{r,1}$ 100C, and $T_{r,n}$ 100D of FIG. 1 are transactions that may appear on the blockchain.

Figure 2:
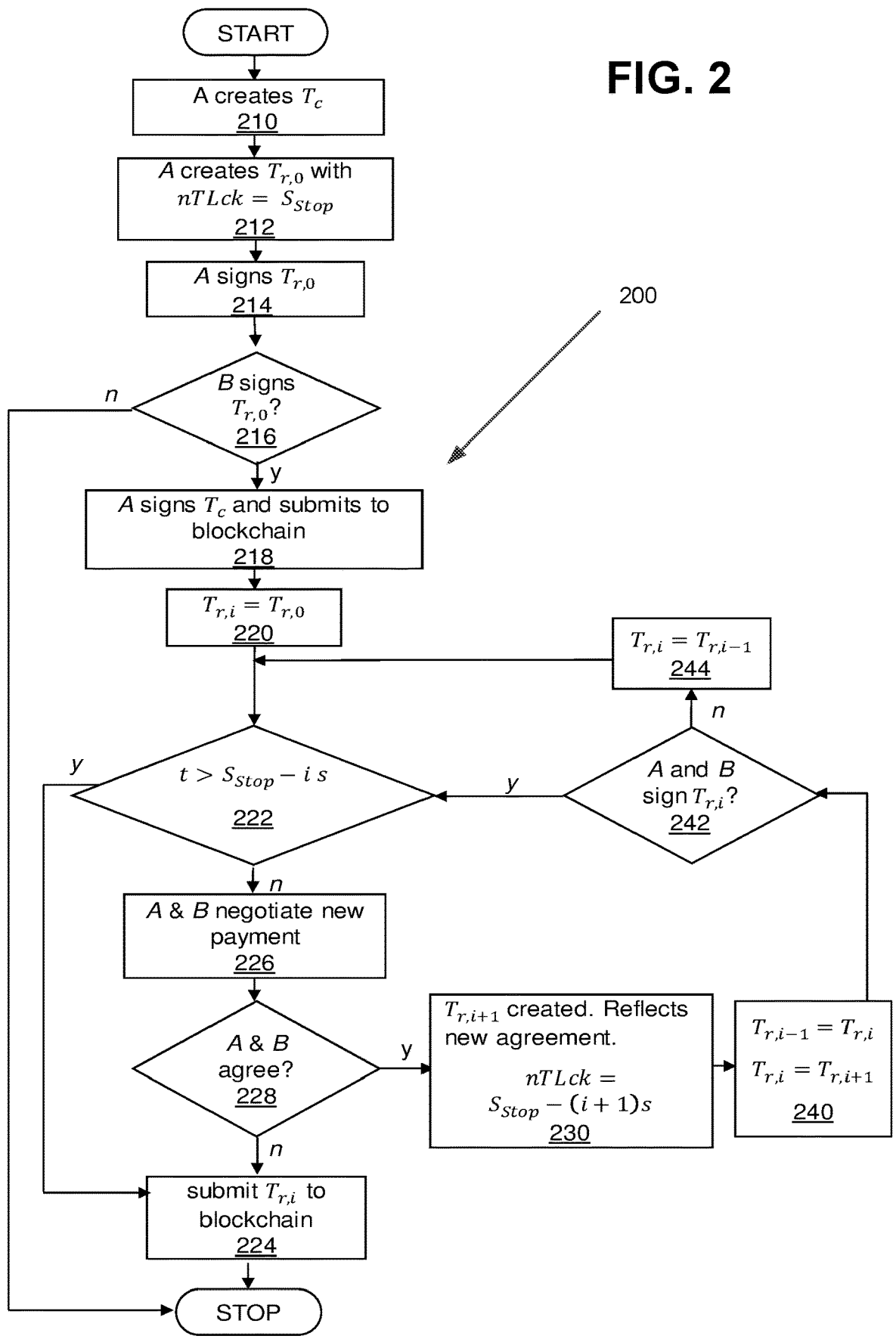
FIG. 2 is a flowchart illustrating how a payment channel in accordance with FIG. 1 may be created.

Operations for constructing the payment channel between Alice and Bob are shown to a flowchart 200 of FIG. 2. Operations 210 and onward are performed by one or more processors of one or more computing devices executing software comprising computer-executable instructions as may be stored on a computer-readable storage medium.

At the operation 210, a processor of a computing device associated with Alice creates a 2-of-2 multi-signature pay-to-script hash (P2SH) transaction, $T_c$, in manners described above.

From the operation 210, control flow proceeds to an operation 212. At the operation 212, a processor of a computing device associated with Alice creates a separate refund transaction, $T_{r,0}$, returning all units of the multi-signature controlled funds to an account associated with Alice in manners described above.

From the operation 212, control flow proceeds to an operation 214. At the operation 214, a processor of a computing device associated with Alice signs the above-described refund transaction.

From the operation 214, control flow proceeds to an operation 216. At the operation 214, a processor of a computing device associated with Bob may also sign the above-described refund transaction. If the transaction is so signed, control flow advances to an operation 218. Alternatively, if the transaction is not so signed, creation of the payment channel is aborted.

At the operation 218, a processor of a computing device associated with Alice signs $T_c$ and submits it to the blockchain. Control flow then advances to an operation 220.

At the operation 220, the above-mentioned refund transaction is recognized as a first refund transaction so that a further transfer from Alice to Bob can be negotiated if time allows.

From the operation 220, control flow advances to an operation 222. At the operation 222, it is determined with sufficient time remains to negotiate the further transfer. If there is not sufficient time remaining, control flow advances to an operation 224 where the last refund transaction is submitted to the blockchain. Alternatively, if sufficient time remains, control flow advances to an operation 226.

At the operation 226, a further transfer between Alice and Bob is negotiated. From the operation 226, control flow advances to an operation 228 where it is determined if the negotiation was successful. If that negotiation was unsuccessful, control proceeds to the operation 224 described above. Alternatively, a successful negotiation will result in control flow advancing to an operation 230.

At the operation 230, a new refund transaction reflective of the agreement stemming from the successful negotiation is created in manner described above. Then, control flow advances to an operation 240 where the new refund transaction is recognized as the current refund transaction.

From the operation 240, control flow advances to an operation 242 where processors of computing devices associated with Alice and Bob may sign the current refund transaction. If so, control flow returns to the operation 222 described above. Alternatively, if the transaction is not so signed, then recognition of the current refund transaction reverts to the previous refund transaction at an operation 244. From the operation 244, control flow returns to the operation 222 described above.

Figure 3:
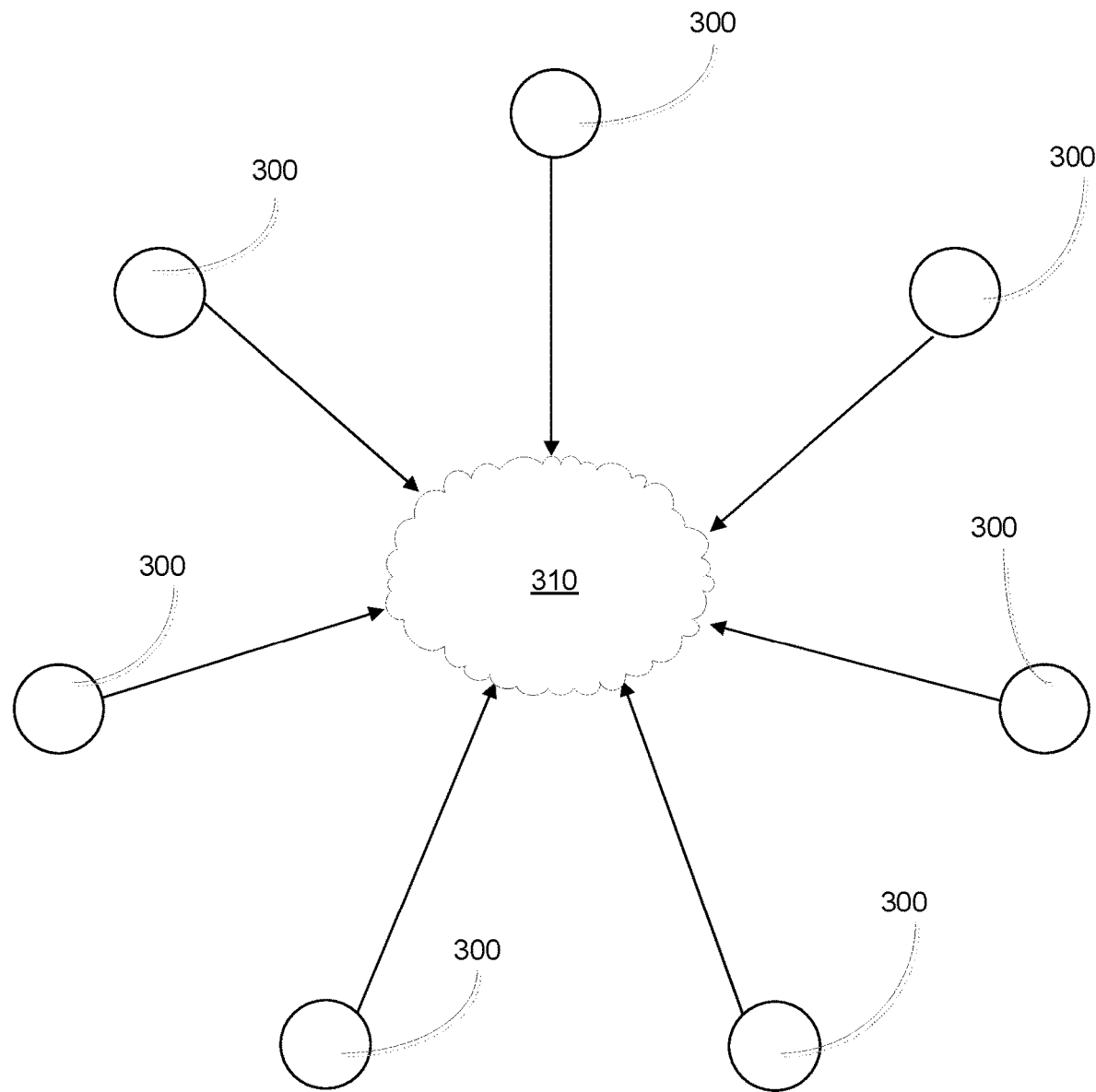
FIG. 3 is a simplified schematic diagram illustrating an example operating environment of the present application.

FIG. 3 shows an example operating environment of the present application.

As illustrated, a plurality of nodes 300 are in communication via a computer network 310. Each of the nodes 300 is a computing device and participating in a blockchain and has one or more associated addresses in association with which the blockchain reflects a quantity of units such as, for example, units of computing resources.

Various ones of the nodes 300 may perform processing steps in distributed processing, the outputs of which combine to form an outcome.

Figure 4:
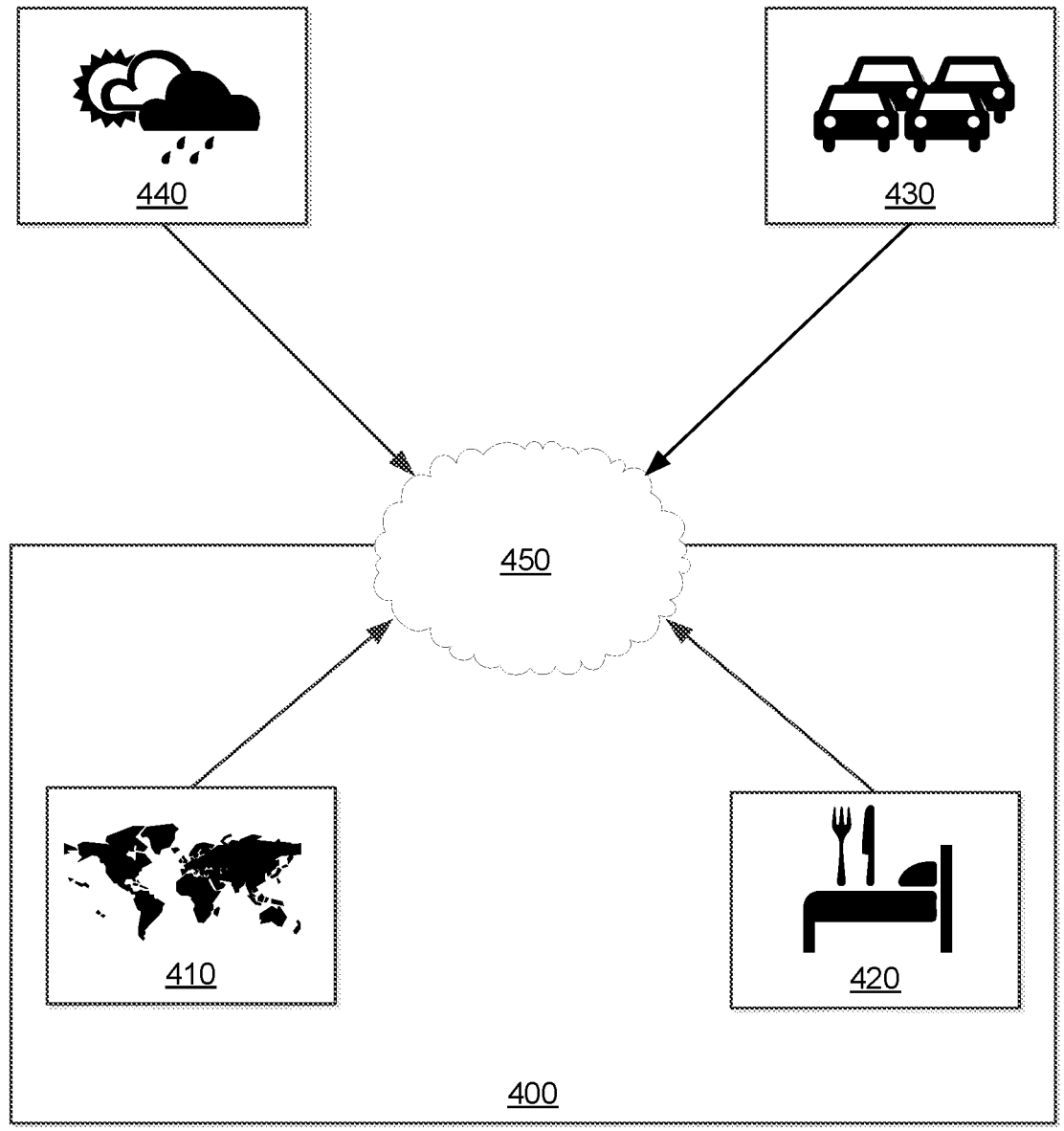
FIG. 4 is a simplified schematic diagram illustrating another example operating environment of the present application.

As further described below, the subject matter of the present application may be applied in a variety of circumstances. For example, FIG. 4 shows a particular example operating environment of the present application in the context of a system and, more particularly, a self-driving vehicle 400.

Distributed processing by the self-driving vehicle 400 may rely on a plurality of modules. For example, distributed processing could involve various nodes such as a map module 410, a hospitality module 420, a weather module 430, and a traffic module 440. As illustrated, the modules 410-440 are in communication via a network 450.

Some of the nodes may be integrated into the self-driving vehicle 400 and others of the nodes may be web or cloud-based. For example, as illustrated, the map module 410 and the hospitality module 420 are integrated into the self-driving vehicle 400 while the weather module 430 and the traffic module 440 are remote from the self-driving vehicle 400.

The map module 410 may be a module to find shortest routes. For example, the map module 410 may choose best routes based on distance.

The hospitality module 420 may choose a route based on hospitality availability. For example, the hospitality module 420 may choose a best route based on restaurants and hotel availability.

The weather module 430 may choose a route based on weather. For example, the weather module 430 may choose a best route based on avoiding severe or inclement weather.

The traffic module 440 may choose a route based on traffic conditions. For example, the traffic module 440 may choose a best route based on avoiding traffic congestion.

Conveniently, the subject-matter of the present application may be applied to allow the modules 410-440 to collectively perform processing steps related to a task related to routing of the self-driving vehicle 400, the outputs of those steps resulting in a particular result, namely a selected route. Notably also because, as further described below, a blockchain is employed to record the outputs of the various processing steps and transmit them between the nodes, the outputs of the modules 410-440 may be recorded in manners to allow for future audit and review such as, for example, for fault determination following an incident involving the self-driving vehicle 400.

As mentioned above, the subject-matter of the present application may also be applied to other contexts. For example, where the subject-matter of the present application is being applied to the control of a system, the particular type of system being controlled need not be a self-driving car. For example, it may be that the subject-matter of the present application is applied to allow modules such as, for example, may be responsible for operation or control of an industrial plant, to collectively perform processing steps related to such a plant. In a particular example, such steps may correspond to decisions or control points of an industrial process. In another example, it may be that the subject-matter of the present application is applied in the operation of a traffic control system such, as, for example, to allow modules of such a system to collectively preform processing steps related to tasks such as the control of traffic signals.

Figure 5:
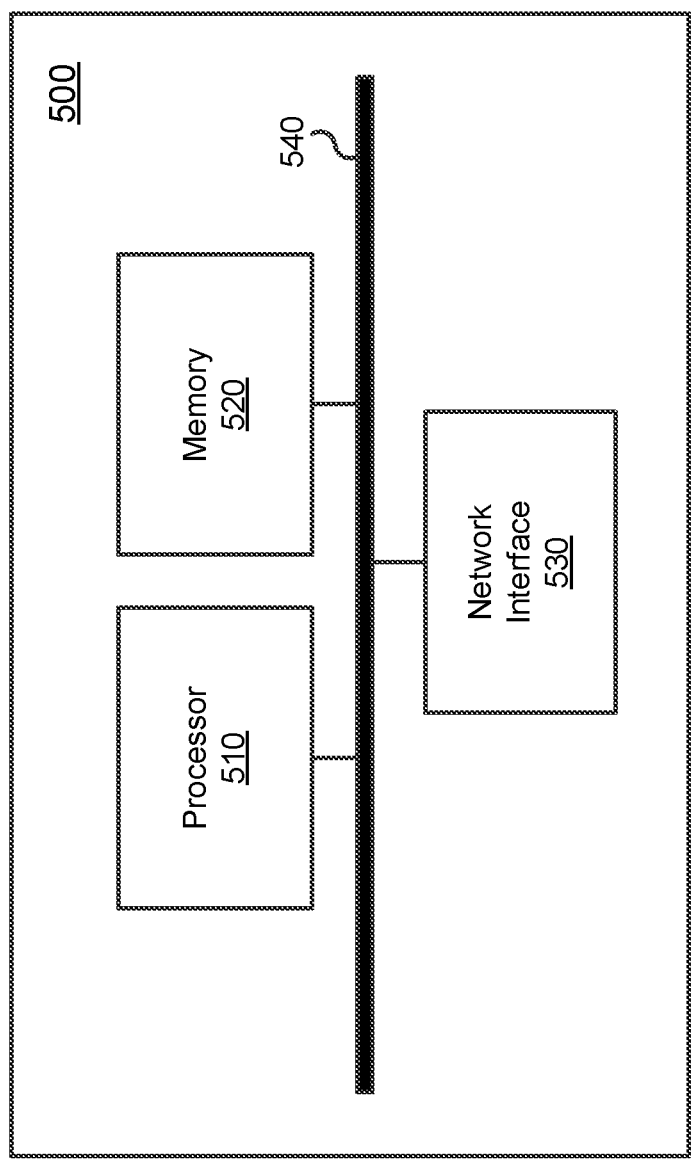
FIG. 5 illustrates an example computing device.

Returning to FIG. 3, recall that each of the nodes 300 is a computing device. FIG. 5 is a high-level operation diagram of an example computing device. Example computing device 500 may be exemplary of one or more of the computer systems described herein including, for example, one or more of the nodes 300. The example computing device 500 includes software that adapts it to perform a particular function.

The example computing device 500 includes a variety of modules. For example, as illustrated, the example computing device 500 may include a processor 510, a memory 520, and a network interface 530. As illustrated, the foregoing components of the example computing device 500 are in communication over a bus 540.

The processor 510 is a hardware processor. The processor 510 may, for example, be one or more ARM, Intel x86, PowerPC processors or the like.

The memory 520 allows data to be stored and retrieved. The memory 520 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 500.

The network interface 530 allows the example computing device 500 to communicate with other computing devices and/or various communications networks such as, for example, the computer network 310 (FIG. 3).

Software comprising instructions is executed by the processor 510 from a computer-readable medium. For example, software may be loaded into random-access memory from persistent storage of the memory 520. Additionally or alternatively, instructions may be executed by the processor 510 directly from read-only memory of the memory 520.

As further described below, software may adapt instances of the example computing device 500 to serve as one or more of the various computer systems mentioned herein, including, for example, one or more of the nodes 300 and/or ones or more of the modules 410-440.

Figure 6:
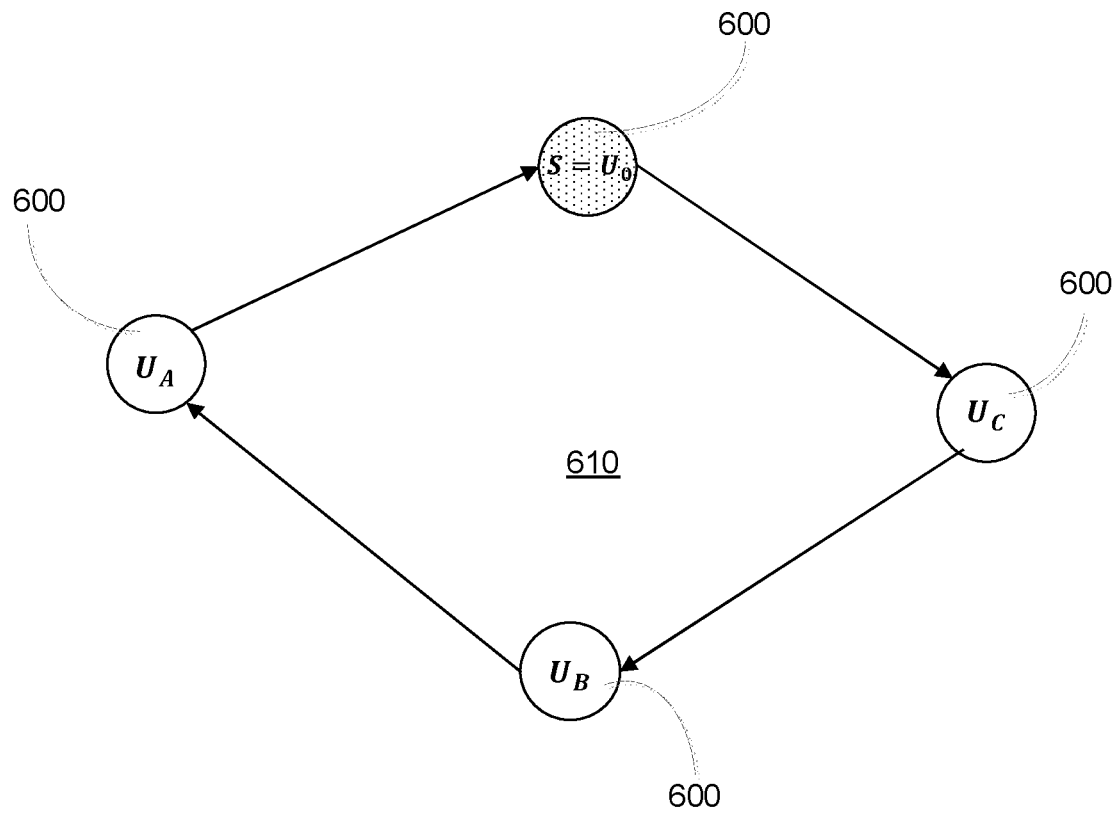
FIG. 6 is a diagram illustrating a cyclically-ordered set constructed of nodes.

As further described below, in the protocol described herein, nodes are responsible for performing processing steps of an overall distributed computing task. Referring to FIG. 6, in a particular example, nodes 600 may be responsible for performing processing tasks in an ordered fashion. One of the nodes acts as a supervisor node—e.g., one of the nodes 600, node $U_0$, may be the supervisor node—and the others of the nodes are responsible for selecting options. The order of the processing steps in a task may be used to realize a cyclically-ordered set formed of the nodes. The cyclically-ordered set may be considered as a ring, with each of the nodes having two other ones of the nodes as an immediately successive node and an immediately previous node to that node. For example, the cyclically-ordered set of the nodes 600 may be depicted as a directed ring 610 as shown in FIG. 6.

Each of the non-supervisory ones of the nodes 600 in the directed ring 610 is assigned a label $U_x$, for convenience of reference, with x corresponding to letters in alphabetical order according to the intended order of the steps in the processing task.

The supervisor node $U_0$ is expected to be the node given the responsibility of overseeing the execution of the protocol. The supervisor node acts as the initiator and coordinator of the protocol as further described below. In one example, it may be that the supervisor node is associated with a party providing resources that will be allocated based on the result of the decision-making process.

The nodes 600, supervisory and/or non-supervisor, may be ones of the nodes 300 and or the modules 410-440.

Further, the supervisor node $U_0$ may be selected from amongst the nodes 300. Such a selection may be made in a variety of manners. For example, it may be that each of the nodes 300 performs an operation or participates in a protocol resulting a particular one of the nodes being selected as the supervisor node. Alternatively, one of the nodes 300 may be selected as the supervisor by some central authority.

Figure 7:
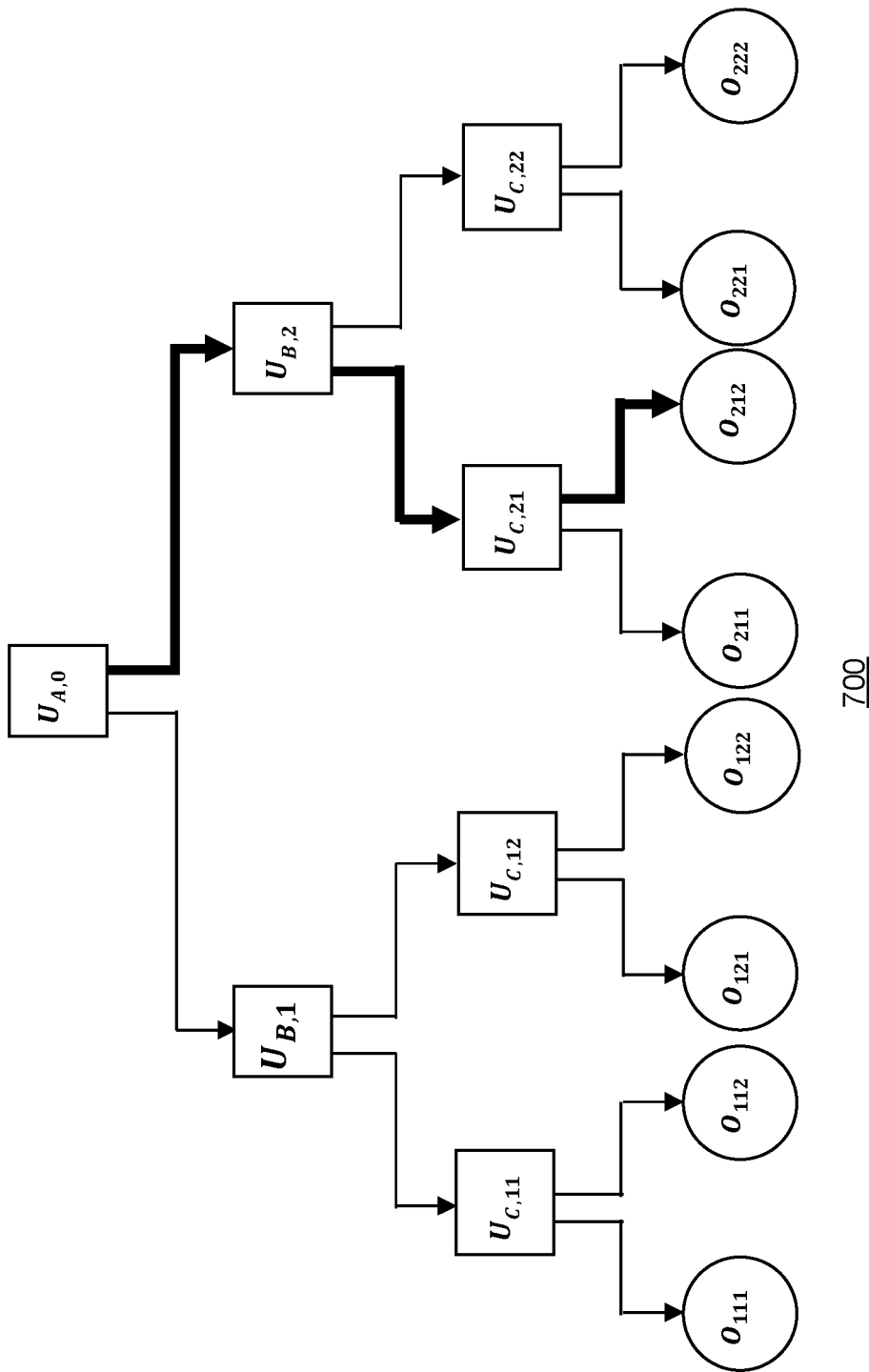
FIG. 7 shows a decision tree corresponding to an example processing task.

The protocol described herein facilitates performing a distributed computing task by participating nodes 600 with the processing steps in the task corresponding to the structure of a decision tree. An example of such a decision tree is found in FIG. 7 which shows a decision tree 700. In the decision tree 700, each level of the tree represents a result of processing by a node participating in the protocol described herein and, in particular, one of those nodes 300. Put differently, each level of the decision tree 700 corresponds to a "factor" in the ultimate results of processing by the distributed system formed by the nodes 600. Each of the nodes 600 at a given level of the decision tree 700 corresponds to a combination of particular outputs of processing steps represented by higher levels of the tree (i.e., levels closer to the root). Each of the edges emerging from a node represents a possible result of processing associated with/performed by that node (a "choice") that a party may make with respect to the decision represented by that node.

In the decision tree 700, there are n=3 steps (and 3 nodes) participating in the processing, with each node associated with processing resulting in one of a respective m=2 options.

In general, each node of the $U_{a,i}$ of the decision tree 700 represents a node, a processing step, and previous outputs (i.e., a particular combination of outputs of processing corresponding to higher levels of the tree) where a represents the processing step performed by a particular node and i represents the output of the previous processing step in the tree. In a particular example, $U_{B,2}$ represents a node performing a processing step B after party $U_A$ had identified a particular output for a processing stepA.

The leaf nodes of the decision tree 700 represent the set of possible final results resulting from particular combinations of outputs from the various processing steps. Put differently, the outputs of the tasks associated with each of the nodes form a path in the decision tree towards a result of the distributed processing. Notably, unlike decision or voting protocols where the majority of votes determines the winner, in the present protocol. it is a combination of the outputs of the various processing steps that determines which result is selected. More particularly, an output of a particular processing step is not a vote for a specific result but rather narrows the possible results of the distributed processing to a set of possible results (i.e., all of the results that are a child of corresponding node of the decision tree 700 along the branch corresponding to the selected output). As such, as each processing step in the pre-determined sequence of steps decreases the set of possible results until only one possible result—the output of the distributed processing—remains.

In a particular example, in the decision tree 700, a possible result $O_{212}$ may be arrived at via a particular path denoted with heavier arrows. First, as shown, if $U_A$ chooses option 2, this restricts the set of possible Results to $\{O_{211}, O_{212}, O_{221}, O_{222}\}$. Next, if $U_B$ chooses option 1, this restricts the set of possible Results to $\{O_{211}, O_{212}\}$. Next, if $U_C$ chooses option 2, this restricts the set of possible Results to $\{O_{212}\}$.

There is a chronological aspect to the processing by the node, consistent with dependency between steps in a task being enforced by the protocol described herein. In particular, nodes each perform their respective processing step in a pre-determined sequence. For example, in the decision tree 700, the pre-determined sequence reflected in the levels of the tree corresponds to the ordering shown in FIG. 6 with the $U_A$ performing its associated processing step before $U_B$ which in turn performs its associated processing step before $U_C$.

Of course, the decision tree 700 is an example and decision trees associated with a given deployment of the protocol described herein may vary. For example, it is not required that there is a 1:1 correspondence between processing steps and nodes. In a particular example, the party $U_A$ could be called upon to perform a processing step B as well as a processing step A. Additionally or alternatively, it may be that some or all of the steps have more (i.e., more than 2) possible outputs. Additionally or alternatively, it may be that different steps have different numbers of possible options. Further, it may be that there are more or fewer steps or nodes.

In the protocol described herein, for each processing step associated with a particular node, that node is to produce a set of private keys corresponding to each possible outcome a given node may have for that processing step. In particular, the party is asked to select a private key corresponding to each option a node may select in the context of each of the possible combination of outputs of prior processing steps already made.

Figure 8:
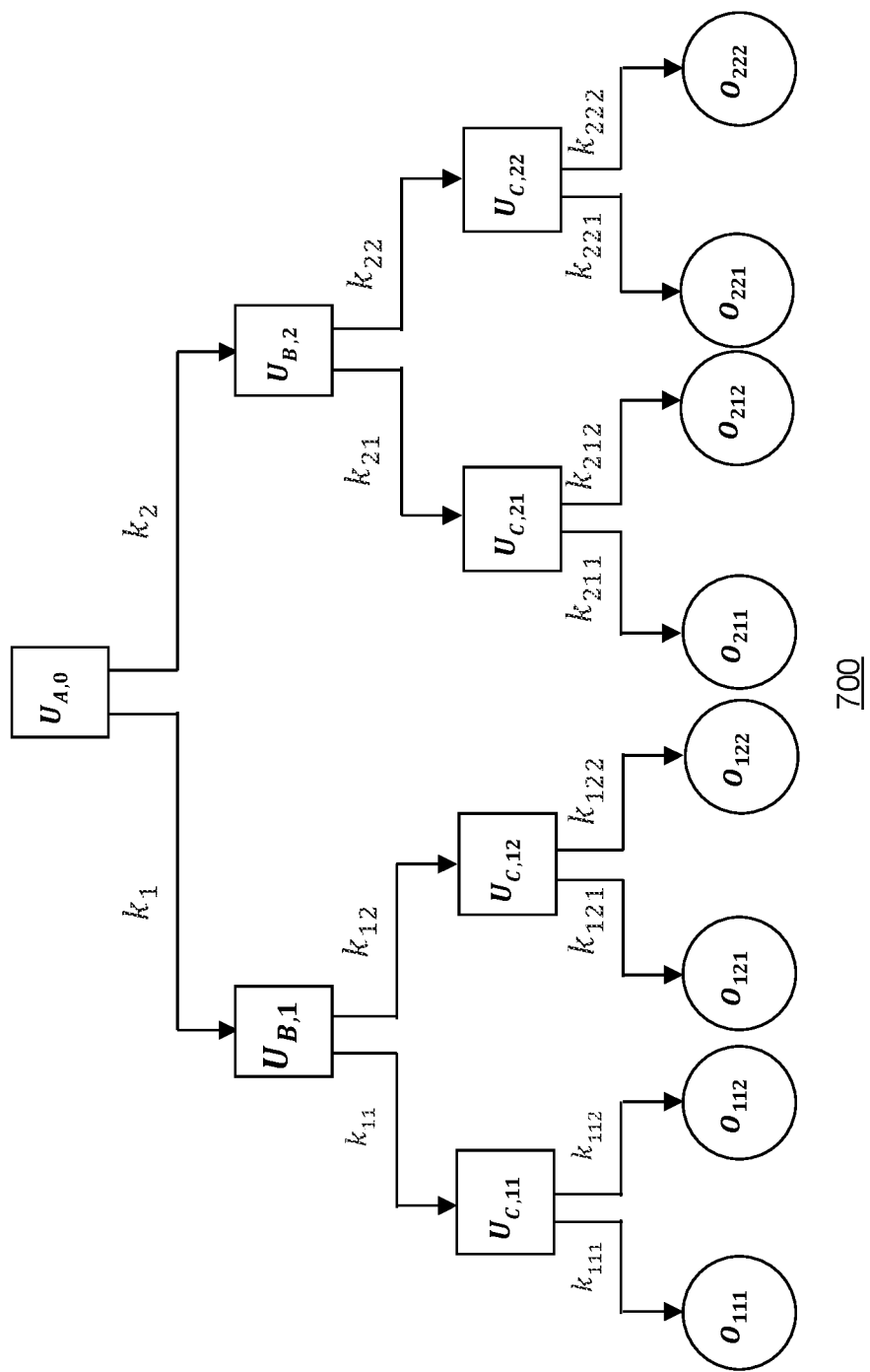
FIG. 8 illustrates private keys associated with particular edges of the decision tree of FIG. 7.

An example of this illustrated in FIG. 8, which shows the decision tree 700, augmented by the various private keys associated with each edges of the decision tree 700. As shown, the private keys may be denoted with a subscript encoding the outputs of earlier processing steps as well as the output of processing at that level (i.e., of the "current" processing step) associated with the particular private keys. For example, in FIG. 8, processing by $U_B$ has two possible outputs, corresponding to four possible outcomes. In a particular example, one choice is for $U_B$ to choose option 1 after $U_A$ has chosen option 2. That choice corresponds to the private key $k_{21}$.

At this stage, the nodes maintain their respective private keys k as a secret.

The private keys k may be generated using techniques as known to persons of ordinary skill. Further various public key cryptosystems may be employed. For example, elliptical curve cryptography (ECC) may be employed. In a particular example, it may be the elliptical curve cryptography is employed and k and its corresponding public key P may be an elliptical curve cryptography public-private key pair such that P=kG where G is a base point on an elliptical curve with order q: q×G=0, where q is a large prime number and 0<k<q. In a particular example, the elliptical curve secp256k1— defined in the document "Standards for Efficient Cryptography 2 (SEC 2)", Certicom Corp, Jan. 27, 2010, —may be employed. In other words, each public key and its corresponding private key may form an elliptical curve cryptography public-private key pair.

Following generation of private keys, values are generated based on corresponding public keys.

First, the supervisor generates a public/private key pair and shares the public key of the pair, denoted $Q_s$, with all of the nodes that are participating in the protocol described herein.

Figure 9:
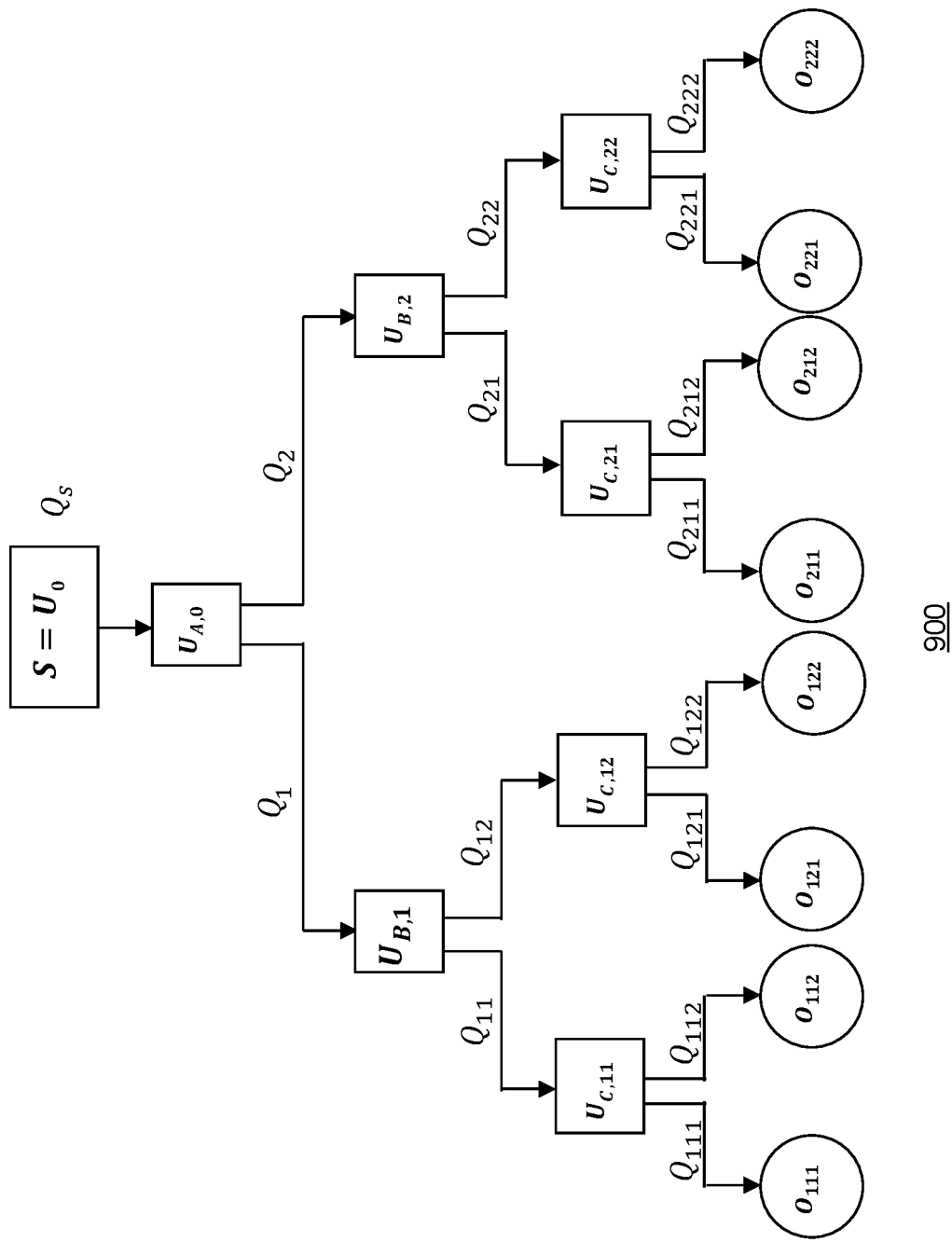
FIG. 9 illustrates public key values related to the private keys of FIG. 8 and associated with particular edges of the decision tree of FIG. 7.

Next, each of the participating nodes, in turn, generates a public key value corresponding to each of its previously generated private keys. This is illustrated, for example, in FIG. 9 showing a decision tree 900, corresponding to the decision tree 700 but augmented to show public key values associated with particular edges.

In particular, the public key values or state values are generated by combining each of the public keys corresponding to the ones of previously generated private keys associated with edges from the root through to a given edge of the tree. In other words, each of the state values is generated by combining the public key associated with a given one of the generated private keys (i.e., on an edge leading out of a node) with a public key value of the from earlier in the tree (i.e., on an edge leading into that node). In the base case (at the first level of the tree below the supervisor), the state values may be generated by combining $Q_s$ with each of the public keys associated with private keys at that level.

The combining may, in the case of elliptical curve cryptosystems, be generated by adding public keys. For example, a given public key may be added to the preceding choice value. Recall that in ECC, a public key P corresponding to a private key k is defined by P=k×G. As such, referring to FIG. 9, when ECC is employed, it may be that $Q_2=Q_s+k_2G$. In another example, it may be that $Q_{21}=Q_2+k_{21}G$.

The supervisor shares its public key $Q_s$ with each of the other nodes participating in the protocol described herein. Similarly, each of the non-supervisory nodes shares its state values with the node immediately previous that node in the cyclically-ordered set and with the supervisor node. Additionally, each of the non-supervisory nodes shares the semantic meaning of those values (i.e. the outcomes to which it corresponds) with the node immediately previous that node in the cyclically-ordered set and with the supervisor node.

Notably, the state values of the final voter in the voting sequence—e.g., $U_C$ in FIG. 6—correspond to the possible results ($O_x$) of protocol described herein. The supervisor node may communicate a new public key/address $S_x$ that is to be directly associated with each result to the other nodes participating in the protocol described herein. This amounts to the set of pairs $\{(O_x, S_x)\}$ where the set $\{O_x\}$ is bijective with the set $\{S_x\}$. It may be that the public key $S_x$ does not belong to the supervisor node itself (i.e., the supervisor node may not be aware of the corresponding private keys), but instead those private keys may be known to a separate entity tasked with carrying out duties associated with the particular results. Conveniently, in this way, follow-up steps may be performed by a third-party which may possess a private key corresponding to the public key $S_x$.

A secret value $sv_x$ corresponds to each of the state values (and, therefore, to each possible result).

Conveniently, where ECC is employed, the secret value $sv_x$ corresponding to a given choice value is related to the choice value as follows. First, recall that according to the homomorphic property of elliptical curve addition, E(m+n) =E(m)+E(n), where E is the function E(x)=xG. Further, recall that where ECC is employed, a given choice value Qx is defined by $Qx=k_sG+k_AG+ \ldots +k_xG$, where $k_s$ is the private key of the supervisor node corresponding to its public key $Q_s$ (i.e., $Q_s=k_sG$). In other words, a private key $sv_x$ corresponding to a choice value $Q_x$ is the sum of the private keys $k_i+k_{i+1}+\ldots+k_x$. In a particular example related to the decision tree 700, $sv_{21}=k_s+k_2+k_{21}$ and $Q_{21}=G\times sv_{21}$.

The protocol described herein involves a circuit of payment channels between the participating nodes 600. In particular, as further described below, a payment channel is established between each of the nodes 600 and its immediately previous node transferring computing resources from that node to its immediately previous node. For example, in FIG. 6, the payment channels would be between each of the nodes 600 and its immediately previous node as shown by the direction of the edges depicted between the nodes. The payment channel is configured to be unlockable by any one of the secret values corresponding to the state values of the immediately previous node. The computing resources transferred by way of the payment channels may, for example, be bitcoins or a portion thereof when the protocol described herein is operating relative to the Bitcoin blockchain.

The use of a payment channel requires that units of computing resources be committed to the channel. For example, in the circuit of payment channels, computing resources will be transferred by each payment channel from a node to its immediately subsequent payment channel.

As the transfer of value is not central to the protocol described herein, this amount could be a nominal amount. As will become apparent, however, each node is required to participate in selecting the result under penalty of forfeiture of the value it commits to the payment channel. Accordingly, it may also be that nodes are required to contribute a sufficiently substantial amount of computing resources to the payment channel to discourage frivolous participation and/or violation of the protocol described herein. The quantity of computing resources committed to each of the payment channels may be identical or, put differently, the resource committed to each of the payment channels may be identical where the resources are fungible.

Before construction of the payment channels of the circuit, the nodes and, in particular, the supervisor node in combination with the other nodes participating in the protocol described herein must agree on two values: a point in time S and a time span s.

First, a time span s is chosen that represents the amount of time each node participating in the protocol described herein requires to complete certain operations which are further described below, namely constructing a payment channel between the node and the immediately previous node, retrieving the secret value used to unlock the previous payment channel in the circuit, selecting one of the possible outcomes further to a processing step associated with the node, and submitting the payment transaction of another payment channel in favour of that node to the block chain. Any one of the nodes may choose time s, given the consensus of the other users. In some implementations, the supervisor node may choose s which may simplify the protocol. Time s may be expressed in appropriate units such as, for example, seconds or number of blocks.

Second, the value, S, is chosen as the starting time of the first transfer to a node being submitted to the blockchain network. Any of the nodes may choose S, given the consensus of the other nodes. In some implementations, the initiator chooses S which may simplify implementation of the protocol.

Notably, S represents a point in time such a may be specified, for example, in either Unix time or block height, whereas s represents a time span.

The payment channels are constructed in a clockwise manner starting with a payment channel between the supervisor node and its immediately subsequent node (i.e., the node responsible for making the final choice). For example, referring to FIG. 6, the first payment channel to be constructed would be the one between $U_0$ and $U_C$ and the final payment channel to be constructed would be the one between $U_A$ and $U_0$.

This ordered sequence assures each node that there exists a payment channel in its favour before it commits resources to a payment channel in favour of its immediately subsequent node. The supervisor node does not receive this assurance, however because its private key $k_s$ is a component of all secret values as may be used to unlock each of the various payment channels. However, because $k_s$ is maintained as a secret by the supervisor node at this stage, the supervisor node may safely create the first payment channel in the circuit absent the assurance of a payment channel in its favour. In particular, if no payment channel is created in favour of the supervisor node, then it may simply wait a sufficient period of time that it may submit the refund transaction of the payment channel it created.

Example operations performed by nodes participating in the protocol described herein will now be discussed with reference to a series of flowcharts presented in FIGS. 10, 13 and 14. In those flowcharts and the following description thereof, the n nodes of the cyclically-ordered set participating in the protocol are identified as $U_0 \ldots U_{n-1}$, starting from the supervisor node $U_0$ and proceeding through the nodes of the cyclically-ordered set through to a node immediately preceding (i.e., immediately previous) the supervisor node in the order of the construction of the various payment channels—i.e., an order opposite to the order of the steps in the intended processing. For example, if the intended order of the processing steps is depicted as being in an anticlockwise direction as shown in FIG. 6, the ordering of the nodes $U_0 \ldots U_{n-1}$ as referred to in FIGS. 10, 13 and 14 would follow a clockwise direction. In a particular example, according to such a numbering, if the node in FIG. 6 labelled $U_B$ is identified as $U_i$, then $U_A$ (FIG. 6) would be $U_{i+1}$ and $U_C$ (FIG. 6) would be Put differently, for the purposes of the flowcharts shown in FIGS. 10, 13 and 14, the node labelled $U_B$ in FIG. 6 would be considered the node immediately previous the node $U_A$ and the node labelled $U_B$ would be the considered the node immediately subsequent the node $U_C$.

Figure 10:
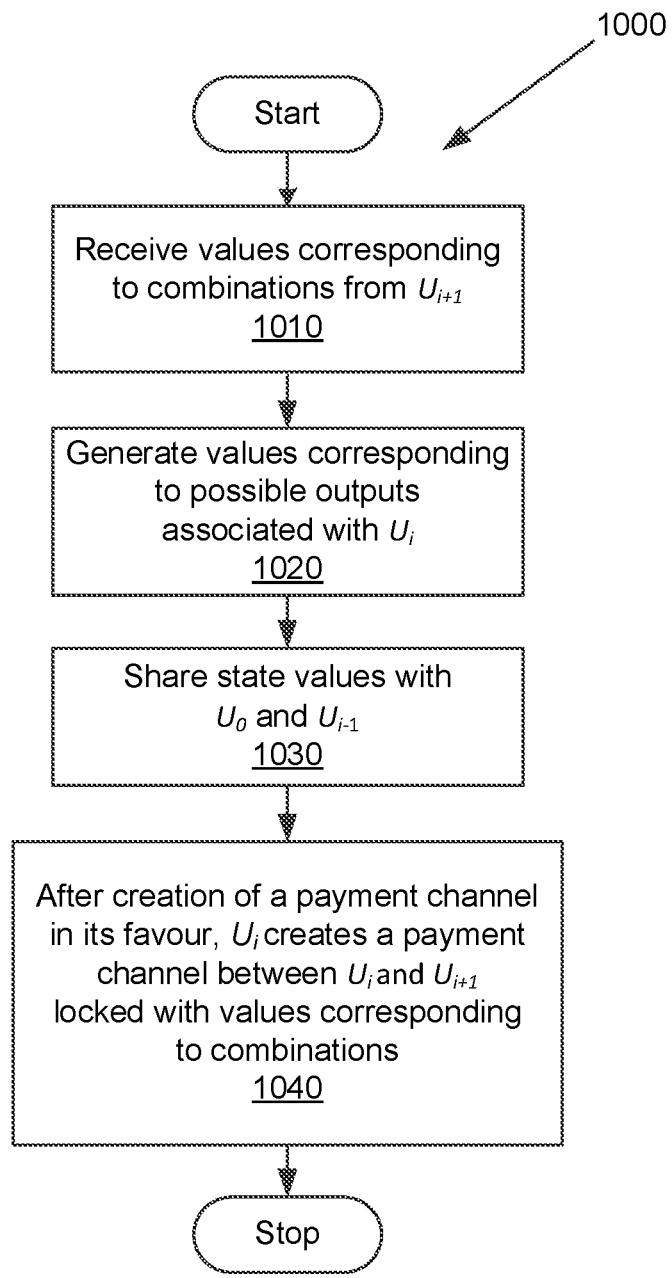
FIG. 10 is a flowchart illustrating operations performed by a particular node of FIG. 6.

FIG. 10 will now be discussed. FIG. 10 shows a flowchart 1000 illustrating operations associated with a particular node participating in the protocol described herein in carrying out operations in preparing to create and then creating a payment channel from that node to its immediately previous node. The various non-supervisory participating nodes may each perform operations corresponding to the operations illustrated in the flowchart 1000 in creating the above-described payment channel circuit. Operations 1010 and onward are performed by one or more processors of a particular, non-supervisory one of the participating nodes. As such, operations 1010 and onward are performed by one or more processors of a computing device, such as, for example, the processor 510 (FIG. 5) of a suitably configured instance of the example computing device 500 executing software comprising computer-executable instructions as may be stored on a computer-readable storage medium such as for, example, storage of the memory 520.

At the operation 1010, the particular node is to receive, from the node immediately subsequent to the particular node in the cyclically-ordered set, the state values associated with the immediately subsequent node. As such, because of the definition of the state values and the ordering of nodes in the cyclically-ordered sets, the particular node receives values corresponding to combinations of possible outcomes of processing steps associated with nodes in the cyclically-ordered set (e.g., the directed ring 610) from the immediately subsequent node through to a node immediately preceding the supervisor node. As explained above, the state values are based on public keys associated with the nodes and each of those public keys corresponds to a possible output of a processing step associated with that node. For example, where ECC is employed, each of the received state values may be determined by summing the public key associated with the supervisor node and the ones of the public keys corresponding to the particular outcomes as described above.

Following the operation 1010, control flow advances to an operation 1020.

At the operation 1020, the particular node is to generate state values for that node. In other words, the particular node generates state values corresponding to outputs selectable by the particular node. The state values are generated based on the received state values and the public keys associated with that node (which correspond to the private keys $k_x$ associated with that node as explained above). As such the state values are generated based on the received values and on public keys corresponding to possible outcomes of a processing step associated with the particular node.

Following the operation 1020, control flow proceeds to an operation 1030.

At the operation 1030, the state values are shared with the supervisor node and with the node immediately previous the particular node in the cyclically-ordered set as described above.

From the operation 1030, control flow proceeds to an operation 1040.

At the operation 1040, the particular node may wait for the creation of a payment channel in its favour by the immediately previous node. In order to create each of the aforementioned payment channels, various transactions will be prepared as described above. For example, a transaction, $T_{pay}$, is prepared using the locking values for that payment channel. That transaction is arranged to transmit a resource—e.g., x units of computing resources, or x BTC— from a source address associated with the immediately previous node to a receiving address of the particular node. According to that transaction, control of the resource is to be transmitted responsive to satisfaction of an execution condition including supply of an unlocking value ($sv_x$) corresponding to any one of the locking values (i.e., any one of the state values). In particular, each of the unlocking value corresponds to a respective one of the state values and is based on private keys corresponding to the public keys upon which that choice value is based. For example, where ECC is employed, each unlocking value may be a sum of those private keys and the private key $k_s$ corresponding to the public key $Q_s$ of the supervisor node. As such, the particular node may await the creation of a blockchain transaction prepared by the immediately previous node and arranged to transmit control of a resource from a source address associated with the immediately previous node to a receiving address of the particular node.

Next, the particular node is to prepare, using the state values, a second payment channel is created by the particular node in favour of the immediately subsequent node. For example, the particular node may prepare such a second payment channel after the payment channel in its favour is created. Preparing such a payment channel is analogous to the description of the first payment channel above, include preparing a blockchain transaction arranged to transmit control of a second resource from a source address associated with the particular node to a receiving address of the immediately subsequent node. The payment channel is configured to transmit control of the resource responsive to satisfaction of an execution condition including supply of any one of a (second) plurality of unlocking values corresponding to the received values.

Figure 11:
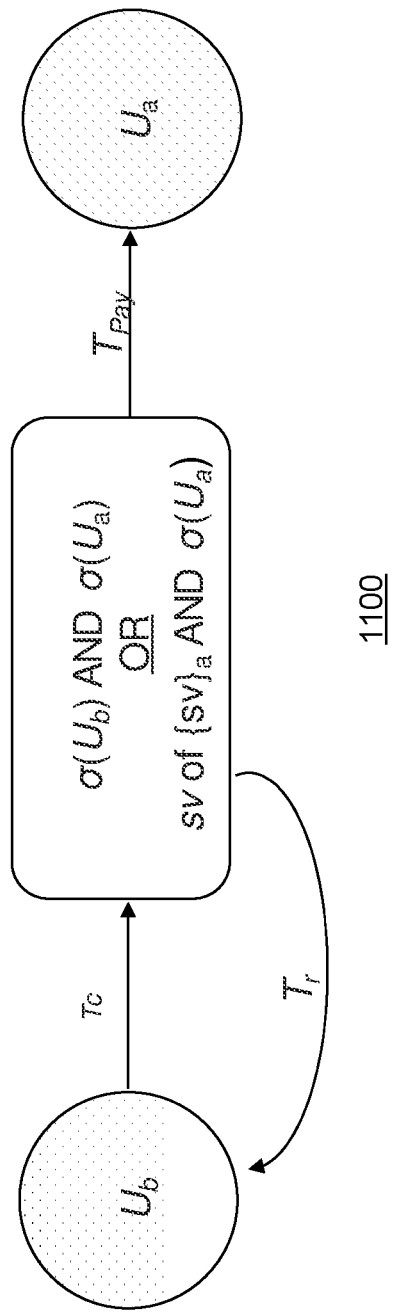
FIG. 11 is a diagram illustrating an example payment channel according to the present application.

FIG. 11 provides a representation 1100 of a $U_a \rightarrow U_b$ payment channel such as may correspond to the aforementioned first and second payment channels.

As illustrated, the channel includes three transactions, $T_c$, $T_{pay}$, and $T_r$. Note that $\sigma(U_x)$ represents the cryptographic signature of $U_x$.

The $T_c$ transaction represents the commitment component of the payment channel. Here, through the transaction, $U_b$ sends/commits a specified number of units to be governed by either: a 2-of-2 multi-signature ($U_b$, $U_a$) or knowledge of any one of a plurality of secret values $\{sv\}_{(a)}$ and the cryptographic signature of $U_a$.

The $T_r$ transaction represents a refund of the specified number of units (from the commitment transaction) back to $U_b$ that becomes eligible for submission to the blockchain after a specified time has expired. As such, $T_r$ is arranged to return control of a resource to a particular node, $U_b$ upon satisfaction of the return condition of time expiry. For this transaction to be executed successfully it requires the cryptographic signatures of $U_a$ and $U_b$.

The $T_{pay}$ transaction is the transfer of the specified number of units from committed funds of $U_b$ to $U_a$. For this transaction to be executed successfully it requires the of any one of a plurality of secret values $\{sv\}_{(a)}$ (corresponding to state values associated with that factor/level of the decision tree) and the cryptographic signature of $U_a$.

Where the blockchain is the Bitcoin blockchain, each of $T_c$, $T_r$ and $T_{pay}$ may be Bitcoin transactions.

Figure 12:
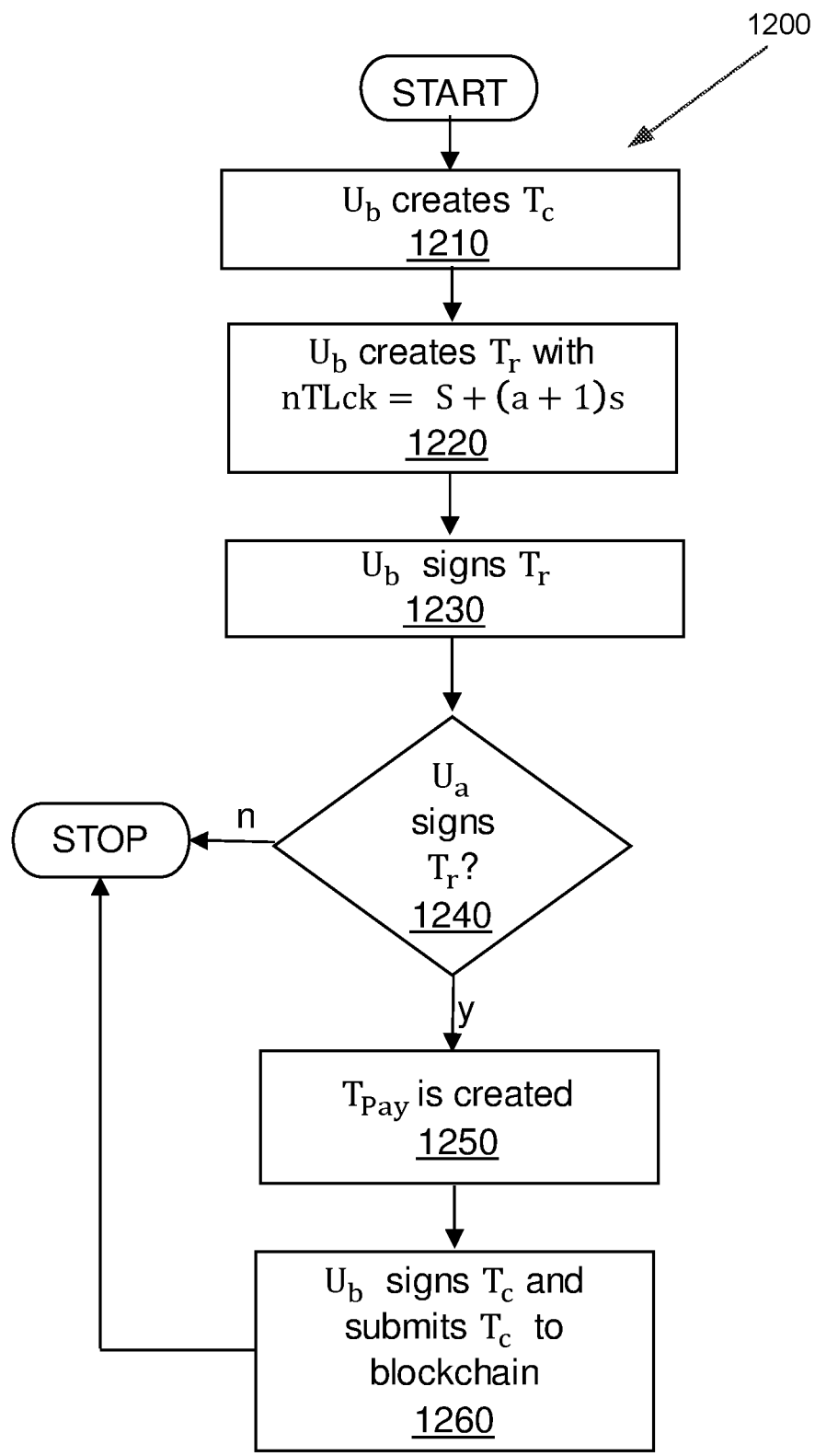
FIG. 12 is a flowchart illustrating how a payment channel in accordance with FIG. 1 may be created.

FIG. 12 shows a flowchart 1200 illustrating operations as may be performed by a node $U_b$ in creating a payment from that node to another node $U_b$ as described above. Operations 1210 and onward are performed by a node $U_b$. As such, operations 1210 and onward are performed by one or more processors of a computing device, such as, for example, the processor 510 (FIG. 5) of a suitably configured instance of the example computing device 500 executing software comprising computer-executable instructions as may be stored on a computer-readable storage medium such as for, example, storage of the memory 520.

At the operation 1210, $U_b$ creates the commitment transaction, $T_c$. The transaction $T_c$ is as described above.

From the operation 1210, control flow proceeds to an operation 1220.

At the operation 1220, the refund transaction, $T_r$ is created. The transaction $T_r$ is as described above. $T_r$ is created with a specified time for expiry of S+(a+1)s, where a is 0 for the first payment transaction in the circuit (e.g., from $U_0$ to $U_c$) and is incremented by one for each payment channel after that in the circuit (e.g., a=0, 1, 2, 3 . . . ).

From the operation 1220, control flow proceeds to an operation 1230.

At the operation 1230, $U_b$ signs the refund transaction.

From the operation 1230, control flow proceeds to an operation 1240.

As explained above, the other participant in the payment channel, $U_a$, is also to sign the refund transaction $T_r$. At the operation 1240, it is determined whether $U_a$ signed the refund transaction $T_r$. If it did not, the creation of the payment channel has failed and is aborted. Alternatively, if $U_a$ signed the refund transaction $T_r$, then control flow proceeds to an operation 1250.

At the operation 1250, $U_b$ creates the payment transaction $T_{pay}$. The transaction $T_{pay}$ is as described above.

From the operation 1250, control flow proceeds to an operation 1260.

At the operation 1260, $U_b$ signs the payment transaction $T_c$ and submits it to the blockchain.

Following the operation 1260, control flow terminates, the payment channel having been created.

After the payment circuit has been completed each of the participating nodes may, in turn, select options. By way of overview, each node participating in the protocol described herein, in turn, selects an option and then based on its choice, redeems the $T_{pay}$ transaction in favour of that node.

Figure 13:
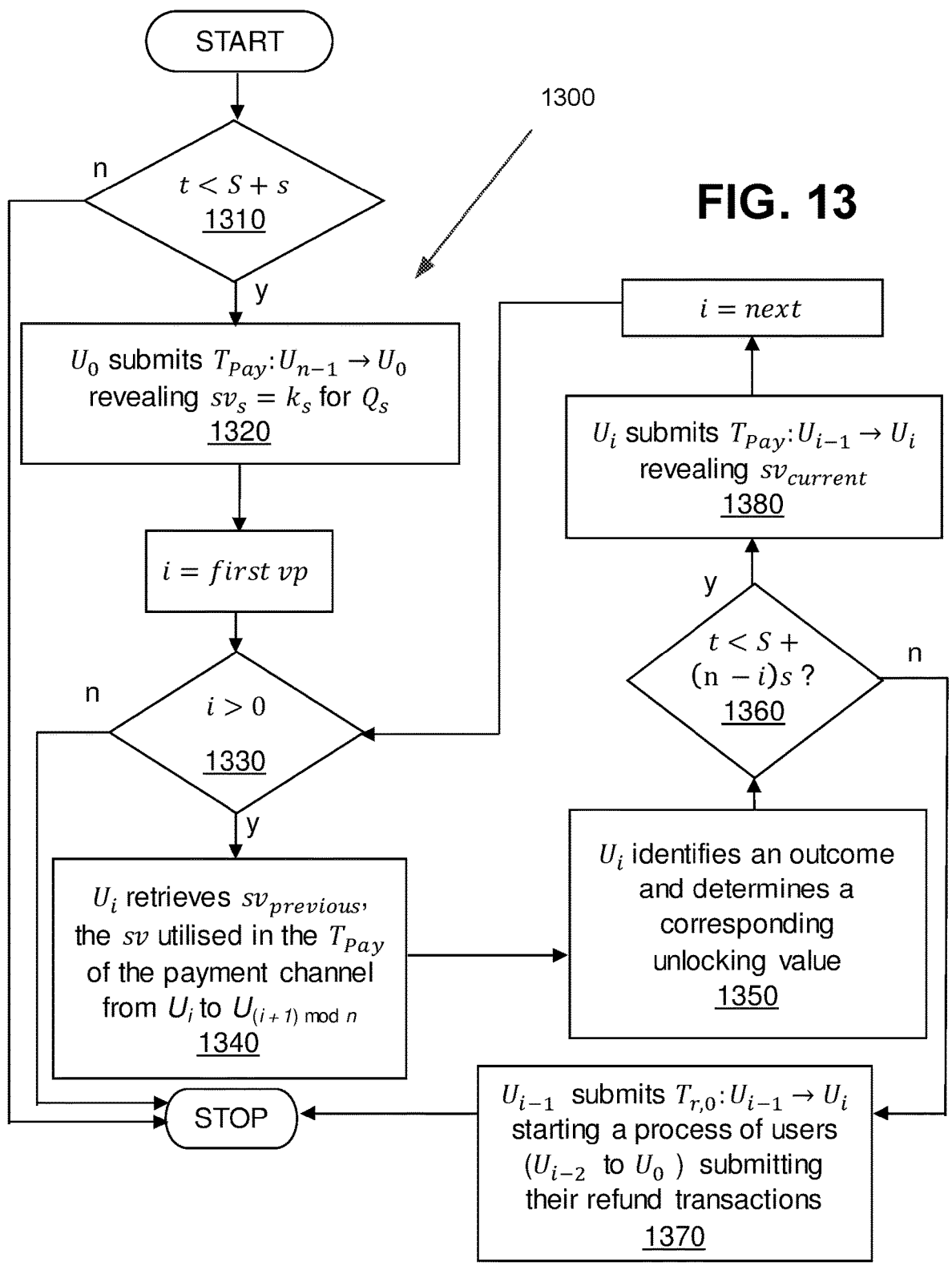
FIG. 13 is a flowchart illustrating operations performed by nodes of FIG. 6.
Figure 14:
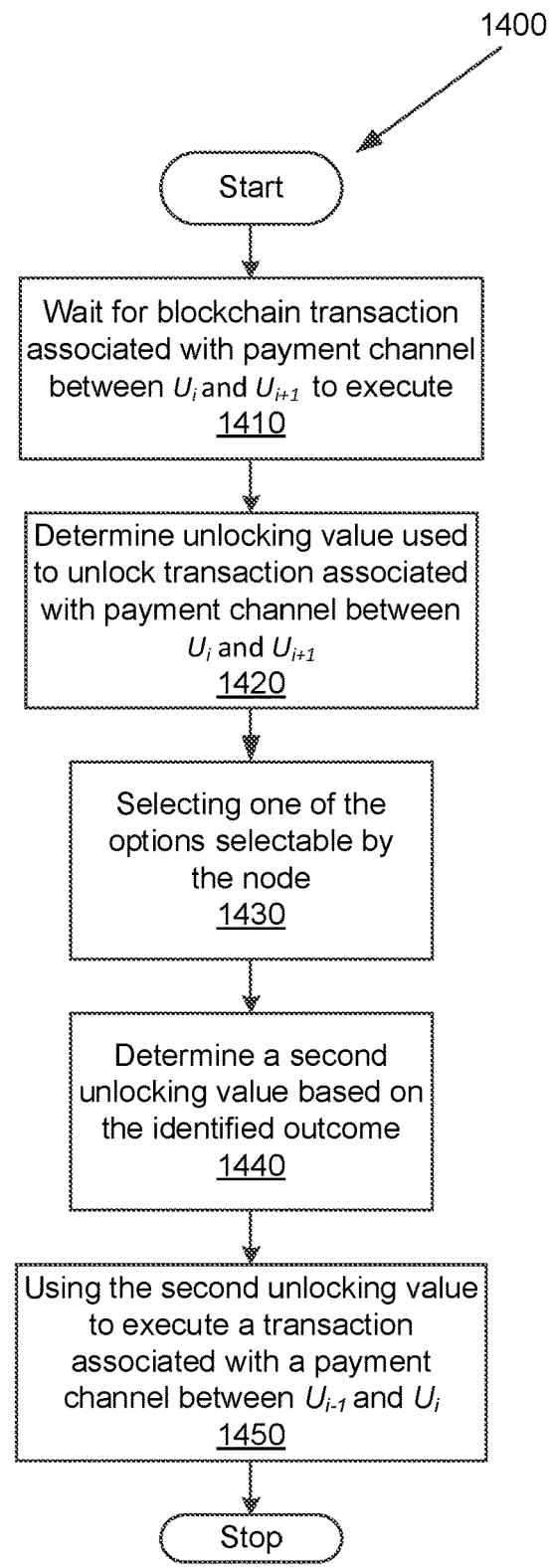
FIG. 14 is a flowchart illustrating operations performed by a particular node of FIG. 6.

FIG. 13 shows a flowchart 1300 illustrating operations 1310 and onward as may be performed by the nodes participating in the protocol described herein in choosing a result. As such, operations 1310 and onward are performed by one or more processors of various computing devices, such as, for example, the processor 510 (FIG. 5) of suitably configured instances of the example computing device 500 executing software comprising computer-executable instructions as may be stored on a computer-readable storage medium such as for, example, storage of the memory 520.

As noted above, the flowchart 1300 and the description thereof utilizes notation consistent with that of the flowchart 1000. In other words, the nodes are numbered in the order of construction of payment channels starting from the supervisor node $U_0$.

At the operation 1310, a check is made to ensure sufficient time is remaining to complete the necessary steps in the protocol described herein. In particular, the current time may be compared to the starting time of the first transfer, S, to ensure that sufficient time exists such that the circuit can be completed without timeout of any of the payment channels. In particular it is determined whether t<S+s, where t is the current time.

If the check at the operation 1310 fails, the protocol described herein is aborted. Otherwise, control flow advances to an operation 1320 where the supervisor node submits the T pay blockchain transaction in its favour. This has the side effect of revealing the value $k_s$ on the blockchain as that is the value corresponding to $Q_s$ used to lock that particular payment channel.

Following the operation 1320, a counter i is initialized to correspond to the node associated with the first processing step, $U_{n-1}$—i.e., the first node to vote. Control flow then proceeds to an operation 1330, where a loop check determines whether each node participating in the protocol has completed its associated processing step and the result has been determined. If so, control flow terminates. Alternatively, if all processing steps have not yet completed (for example, on the first pass through the operation 1330), the control flow proceeds to an operation 1340.

At the operation 1340, the unlocking value $sv_{previous}$ utilized in the payment transaction of the payment channel as would have been submitted to the blockchain at the operation 1320 or, as described below, an operation 1350) is extracted from the blockchain—i.e., from the payment transaction of the payment channel from $U_i$ to $U_{(i+1) \mod n}$. Conveniently, because $sv_{previous}$ is extracted from a blockchain transaction that is only submitted after the immediately subsequent node (i.e., the node associated with the previous processing step) has identified an output, ordering of processing steps is enforced.

From the operation 1340, the control flow advances to an operation 1350.

At the operation 1350, the node $U_i$ identifies one of the possible outcomes further to a processing step associated with that node. That node then determines a corresponding unlocking value by combining the value $sv_{previous}$ with the private key ($k_{ijk}$) corresponding to the public key corresponding to the identified output. For example, where ECC is being employed, IL determined a secret value $sv_{ijk}$ value by computing $sv_{ijk} = sv_{previous} \; k_{ijk}$. Notably, this works because each of the definition of the various state values used to lock the various $T_{pay}$ transactions and because of the homomorphic property.

Regarding performing processing steps, steps may be performed by each of the nodes 300 in a variety of manners. For example, where the nodes 300 correspond to modules of a self-driving car, processing steps may select an output programmatically such, as, for example, based on input data provided to that node. It may be that the input data includes data received via one or more input devices, such as, for example, from a user.

From the operation 1350, control flow advances to an operation 1360. At the operation 1360 it is determined whether there is sufficient time remaining to complete the transaction. In particular it is determined whether t<S+(n−i)s, where t is the current time and i is an index of the current node counting from the supervisor node, with the supervisor node being 0, the node immediately subsequent the supervisor node (i.e., the node associated with in the last processing step) having the index 1, and so forth through to the node associated with first processing step having the index (n−1), as was explained above.

From the operation 1360, if is determined that sufficient time remains, control flow advances to an operation 1380. Alternatively, if it is determined that sufficient time does not remain, control flow advances to an operation 1370.

At the operation 1370, the lack of sufficient remaining time is handled by having $U_{i-1}$ trigger abort of the protocol described herein by way of the refund transactions. In particular, $U_{i-1}$ submits, to the block chain, the refund transaction in favour of the immediately subsequent node in the cyclically-ordered set of nodes, $U_i$, thereby starting a process of having the nodes through to the node intended to perform the final processing step (i.e., the node immediately subsequent the supervisor node), $U_I$, submitting their respective refund transactions to the blockchain.

At the operation 1380 (as sufficient time remains), the node $U_i$ submits the $T_{pay}$ blockchain transaction in its favour to the blockchain, thereby revealing $sv_{current}$ on the blockchain.

Following the operation 1380, the counter i is decremented to correspond to the next node in the choosing sequence and then control flow returns to the operation 1330 (as described above), thereby looping to handle the choosing by the next node in the sequence.

The flowchart 1300 describes the execution of processing steps across the nodes participating in a distributed computing task as a whole. FIG. 14 shows a flowchart 1400 illustrating operations performed by a particular node participating in the protocol described herein in carrying out operations in association with a processing task. The various non-supervisory participating nodes may each perform operations corresponding to the operations illustrated in the flowchart 1400 in creating the above-described payment channel circuit. Operations 1410 and onward are performed by one or more processors of a particular, non-supervisory one of the participating nodes. As such, operations 1410 and onward are performed by one or more processors of a computing device, such as, for example, the processor 510 (FIG. 5) of a suitably configured instance of the example computing device 500 executing software comprising computer-executable instructions as may be stored on a computer-readable storage medium such as for, example, storage of the memory 520.

As noted above, the flowchart 1400 and the description thereof utilizes notation consistent with that of the flowchart

1000. In other words, the nodes are numbered in the order of construction of payment channels starting from the supervisor node $U_0$.

First, the particular node must ensure that it waits for the immediately subsequent node to make its choice. Accordingly, at the operation 1410, the particular node waits for the blockchain transaction $T_{pay}$ associated with the payment channel from the particular node to the immediately subsequent node to execute, i.e., to be unlocked and submitted to the blockchain. Following that transaction being submitted to the blockchain, control flow advances to an operation 1420.

At the operation 1420, the particular node extracts, from the blockchain, the unlocking value $sv_{previous}$ used to unlock the blockchain transaction $T_{pay}$ detected at the operation 1410. As described above, the value $sv_{previous}$ indicates outputs of processing steps associated with nodes choosing before the particular node. As such, the value $sv_{previous}$ indicates outputs of processing steps associated with nodes in the cyclically-ordered set from the immediately subsequent node through to the node immediately preceding the supervisor node. Further, as described above, the value $sv_{previous}$ is based on private keys corresponding to ones of the public keys associated with those nodes and corresponding to the aforementioned selected options previously chosen or selected by those nodes. In other words, the value $sv_{previous}$ corresponds to a choice value of the immediately subsequent node. For example, as described above, where ECC is employed the unlocking value may be a sum of the private keys corresponding to the outputs of processing steps associated with nodes in the cyclically-ordered set from the immediately subsequent node through to the node immediately preceding the supervisor node and private key ($k_s$) corresponding to the public key ($Q_s$) associated with the supervisor node.

Next, at the operation 1430, the particular node, identifies one of the possible outcomes further to a processing step associated with that node in manners described above. As described above, a node may identify an output in a variety of manners such as, for example, programmatically according to input and/or state associated with that node. It may be, for example, that some of the input is received via an input interface such as, for example, from a user.

From the operation 1430, control flow advances to an operation 1440.

As described previously, a public key of the particular node corresponds to each of the possible outcomes of the processing task associated with that node. At the operation 1440, the unlocking value is determined based the unlocking value $sv_{previous}$ extracted at the operation 1420 and on a private key corresponding to the public key corresponding to the identified outcome. For example, where ECC is employed, the values may be combined by adding in manners described above.

From the operation 1440, control flow advances to an operation 1450.

At the operation 1450, the unlocking value determined at the operation 1440 is used to execute a transaction associated with a payment channel between the immediately previous node and the particular node. In particular, the particular node may unlock a corresponding $T_{pay}$ transaction using the unlocking value determined at the operation 1440 and then submit the unlocked transaction to the blockchain. For example, the $T_{pay}$ transaction may be unlocked by submitting the unlocking value into the unlocking script of the transaction. Notably, as described above, unlocking a transaction with the unlocking value determined at the operation 1440 and submitting it to the blockchain has the side effect of revealing the unlocking value on the blockchain.

Following the operation 1450, choosing by the particular node is completed.

The protocol described herein may be applied in a large variety of application. For example, it may be applied to a self-driving vehicle such as, for example, the self-driving vehicle 400. In some such implementations, it may be that the possible outcomes of a processing step associated with a given node participating in the protocol described herein may correspond to outputs of an associated module of the control system of the vehicle. For example, the outputs may be outputs of the modules 410-440.

In implementing the protocol described herein on a given blockchain various implementation details may need to be considered. For example, in the Bitcoin blockchain, it is possible that a transaction's associated transaction ID may change while the transaction remains valid. This may be referred to as the transaction malleability issue. This may present problems in implementation of protocols such as the protocol described herein reliant on payment channels where the refund ($T_r$) and payment ($T_{pay}$) transactions may be implemented in manners reference an identifier of a previous transaction. Additional information on transaction malleability in Bitcoin is found in, for example, "The Who, What, Why and How of the Ongoing Transaction Malleability Attack" by Aaron van Wirdum (Oct. 7, 2015) published in Bitcoin Magazine. Transaction malleability may be eliminated by the SegWit fork of Bitcoin—see, e.g., "Segregated Witness Benefits" available from https://bitcoincore.org/en/2016/01/26/segwit-benefits/ (updated Oct. 19, 2016).

It should be noted that the above-mentioned embodiments illustrate rather than limit the subject matter of the present invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The subject matter of the present invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for distributed control comprising:

receiving, by a particular node in a cyclically-ordered set of nodes participating in a blockchain network, from a node immediately subsequent to the particular node, values corresponding to combinations of possible outcomes of processing steps associated with nodes from the immediately subsequent node through to a node immediately preceding a supervisor node, wherein the values are based on public keys associated with nodes of the cyclically-ordered set of nodes, each corresponding to possible outcomes of a processing step associated with a node in the cyclically ordered set of nodes and on a public key of the supervisor node;

generating, by the particular node, state values based on the received values and on public keys corresponding to possible outcomes of a processing step associated with the particular node;

sharing, by the particular node, the state values with the supervisor node and with a node immediately previous the particular node; and preparing, by the particular node using the state values, a blockchain transaction arranged to transmit control of a resource from a source address associated with the particular node to a receiving address of the immediately subsequent node responsive to satisfaction of an execution condition including supply of any one of a plurality of unlocking values corresponding to the received values.

2. The method of claim 1, wherein the nodes correspond to modules associated with a system and wherein the possible outcomes of a processing step associated with a given node correspond to outputs of an associated module of a control system of the system.

3. The method of claim 1, wherein each of the received values is determined by combining a public key associated with the supervisor node with one or more of the public keys corresponding to a respective one of the combinations of possible outcomes of processing steps associated with nodes from the immediately subsequent node through to the node immediately preceding the supervisor node.

4. The method of claim 3, wherein a given one of the received values is determined by summing a public key associated with the supervisor node and the one or more of the public keys corresponding to the outcomes of the respective one of the combinations of possible outcomes.

5. The method of claim 1, wherein the state values are formed by combining the received values and the public keys corresponding to possible outcomes of a processing step associated with the particular node.

6. The method of claim 5, wherein each of the state values is formed by summing one of the received values and one of the public keys corresponding to possible outcomes of the processing step associated with the particular node.

7. The method of claim 1, further comprising:

waiting for the blockchain transaction to execute and obtaining, from the blockchain transaction, a first unlocking value used to unlock the blockchain transaction, the first unlocking value indicating outputs of processing steps associated with nodes from the immediately subsequent node through to the node immediately preceding the supervisor node and based on private keys corresponding to one or more of the public keys associated with those nodes and corresponding to the outputs;

identifying one of possible outcomes of the processing step associated with the particular node;

determining, by the particular node, a second unlocking value based on a private key that corresponds to the public key corresponding to the identified outcome and the first unlocking value, the second unlocking value corresponding to one of the state values and indicating outputs of processing steps associated with nodes from the particular node through to the node immediately preceding the supervisor node; and using the second unlocking value, executing another blockchain transaction.

8. The method of claim 7, wherein the another blockchain transaction is prepared by the immediately previous node and arranged to transmit control of a second resource from a source address associated with the immediately previous node to a receiving address of the particular node responsive to satisfaction of a second execution condition including supply of any one of a second plurality of unlocking values corresponding to one of the state values and wherein the blockchain transaction arranged to transmit control of the resource from the source address associated with the particular node to the receiving address of the immediately subsequent node is prepared after preparation of the another blockchain transaction.

9. The method of claim 8, wherein each of the unlocking values of the second plurality of unlocking values corresponds to a respective one of the state values and is based on private keys corresponding to the public keys upon which that state value is based.

10. The method of claim 7, wherein the first unlocking value is a sum of the private keys corresponding to the outputs of processing steps associated with nodes from the immediately subsequent node through to the node immediately preceding the supervisor node and a private key corresponding to the public key associated with the supervisor node.

11. The method of claim 7, wherein the second unlocking value is a sum of the private keys corresponding to the outputs of processing steps associated with nodes from the particular node through to the node immediately preceding the supervisor node and a private key corresponding to the public key associated with the supervisor node.

12. The method of claim 8, wherein the resource and the second resource are identical.

13. The method of claim 1, wherein each public key and its corresponding private key form an elliptical curve cryptography public-private key pair.

14. A computer-implemented system comprising:

one or more processors; and memory including instructions that, upon execution, cause the one or more processors to implement steps of a method comprising:

receiving, by a particular node in a cyclically-ordered set of nodes participating in a blockchain network, from a node immediately subsequent to the particular node, values corresponding to combinations of possible outcomes of processing steps associated with nodes from the immediately subsequent node through to a node immediately preceding a supervisor node, wherein the values are based on public keys associated with the nodes, each corresponding to possible outcomes of a processing step associated with a node in the cyclically ordered set of nodes that node, and on a public key of the supervisor node;

generating, by the particular node, state values based on the received values and on public keys corresponding to possible outcomes of a processing step associated with the particular node;

sharing, by the particular node, the state values with the supervisor node and with a node immediately previous the particular node; and preparing, by the particular node using the state values, a blockchain transaction arranged to transmit control of a resource from a source address associated with the particular node to a receiving address of the immediately subsequent node responsive to satisfaction of an execution condition including supply of any one of a plurality of unlocking values corresponding to the received values.

15. A non-transitory computer-readable storage medium storing instructions for adapting a computer system to perform a method, the method comprising:
- receiving, by a particular node in a cyclically-ordered set of nodes participating in a blockchain network, from a node immediately subsequent to the particular node, values corresponding to combinations of possible outcomes of processing steps associated with nodes from the immediately subsequent node through to a node immediately preceding a supervisor node, wherein the values are based on public keys associated with the nodes, each corresponding to possible outcomes of a processing step associated with a node in the cyclically ordered set of nodes, and on a public key of the supervisor node;
- generating, by the particular node, state values based on the received values and on public keys corresponding to possible outcomes of a processing step associated with the particular node;
- sharing, by the particular node, the state values with the supervisor node and with a node immediately previous the particular node; and
- preparing, by the particular node using the state values, a blockchain transaction arranged to transmit control of a resource from a source address associated with the particular node to a receiving address of the immediately subsequent node responsive to satisfaction of an execution condition including supply of any one of a plurality of unlocking values corresponding to the received values.

16. The computer-implemented system for carrying out a method according to claim 14, wherein the nodes correspond to modules associated with a system and wherein the possible outcomes of a processing step associated with a given node correspond to outputs of an associated module of a control system of the system.

17. The computer-implemented system for carrying out a method according to claim 16, wherein each of the received values is determined by combining a public key associated with the supervisor node with one or more of the public keys corresponding to a respective one of the combinations of possible outcomes of processing steps associated with nodes from the immediately subsequent node through to the node immediately preceding the supervisor node.

18. The computer-implemented system for carrying out a method according to claim 16, wherein the state values are formed by combining the received values and the public keys corresponding to possible outcomes of a processing step associated with the particular node.

19. The non-transitory computer-readable storage medium storing instructions for adapting a computer system to perform a method according to claim 15, wherein the nodes correspond to modules associated with a system and wherein the possible outcomes of a processing step associated with a given node correspond to outputs of an associated module of a control system of the system.

20. The non-transitory computer-readable storage medium storing instructions for adapting a computer system to perform a method according to claim 15, wherein each of the received values is determined by combining a public key associated with the supervisor node with one or more of the public keys corresponding to a respective one of the combinations of possible outcomes of processing steps associated with nodes from the immediately subsequent node through to the node immediately preceding the supervisor node.

* * * * *